US011497002B2

(12) United States Patent
Vaidya

(10) Patent No.: US 11,497,002 B2
(45) Date of Patent: Nov. 8, 2022

(54) APPARATUS AND METHODS FOR RESOURCE MESSAGE SEGMENTATION IN WIRELESS NETWORKS

(71) Applicant: CHARTER COMMUNICATIONS OPERATING, LLC, St. Louis, MO (US)

(72) Inventor: Maulik Vaidya, Escondido, CA (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 16/990,883

(22) Filed: Aug. 11, 2020

(65) Prior Publication Data

US 2022/0053474 A1    Feb. 17, 2022

(51) Int. Cl.
*H04W 72/04*     (2009.01)
*H04W 48/08*     (2009.01)
*H04W 76/27*     (2018.01)

(52) U.S. Cl.
CPC ....... *H04W 72/0406* (2013.01); *H04W 48/08* (2013.01); *H04W 76/27* (2018.02)

(58) Field of Classification Search
None
See application file for complete search history.

(56) References Cited

U.S. PATENT DOCUMENTS

| 2017/0230864 A1* | 8/2017 | Jha | H04W 72/042 |
| 2020/0146093 A1* | 5/2020 | Zhang | H04W 72/042 |
| 2020/0221329 A1* | 7/2020 | Kim | H04W 72/0453 |
| 2021/0218535 A1* | 7/2021 | Liang | H04L 5/0053 |

FOREIGN PATENT DOCUMENTS

| WO | WO-2021096184 A1 * | 5/2021 | H04W 72/12 |
| WO | WO-2021147089 A1 * | 7/2021 | H04L 2012/5603 |

OTHER PUBLICATIONS

Nokia 5G New Radio (NR) (May 15, 2018).
3GPP TS 38.331, Jun. 2019.
3GPP TS 38.300 V15.6.0 "NR and NG-RAN Overall Description, Stage 2 (Release 15)" dated Jun. 2019.
(Continued)

*Primary Examiner* — Hong S Cho
(74) *Attorney, Agent, or Firm* — Patent Beach PC

(57) ABSTRACT

Apparatus and methods for segmentation of resource/control messages in a wireless system. In one embodiment, the messages being segmented are radio resource control (RRC) messages used in a downlink direction for a 3GPP 5G New Radio (NR) system. In various implementations, RRC segmentation in the downlink direction is enabled in a generic manner when message size exceeds a prescribed limit. A container format is specified, and messaging exchanged between the UE and base station (gNB) indicates (i) the UE's capability for receiving segmented messages, and (ii) data related to the segmented message that the UE can utilize to receive and reassemble the message, as well as a protocol to be followed upon detection of link failure. In one variant, a 4G/4.5G LTE/LTE-A configuration is disclosed.

25 Claims, 21 Drawing Sheets

(56) References Cited

OTHER PUBLICATIONS

3GPP TS 38.306 V15.7.0 (Sep. 2019); 3rd Generation Partnership Project; technical Specification Group Radio Access Network; NR; User Equipment (UE) Radio Access Capabilities (Release 15); 55 pages.
3GPP TS 38.323 V15.6.0 "NR; Packet Data Convergence Protocol (PDCP) specification (Release 15)" dated Jun. 2019.
3GPP TS 38.401 Vers. 16.2.0 Release 16 (Jul. 2020).
ETSI TS 138.323, Nov. 2020.
Report of 3GPP TSG RAN WG2 meeting #105bis, Xi'an, China, Apr. 2019 (R2-1905501).
TS 38.331 V15.6.0 "NR; Radio Resource Control (RRC); Protocol specification" dated Jun. 2019.

* cited by examiner

FIG. 8

6.2.1 General message structure

=== Unmodified sections omitted ===

– DL-DCCH-Message

The *DL-DCCH-Message* class is the set of RRC messages that may be sent from the network to the UE on the downlink DCCH logical channel.

-- ASN1START
-- TAG-DL-DCCH-MESSAGE-START

DL-DCCH-Message ::=        SEQUENCE {
    message                DL-DCCH-MessageType
}

DL-DCCH-MessageType ::= CHOICE {
    c1                      CHOICE {
        rrcReconfiguration          RRCReconfiguration,
        rrcResume                   RRCResume,
        rrcRelease                  RRCRelease,
        rrcReestablishment          RRCReestablishment,
        securityModeCommand         SecurityModeCommand,
        dlInformationTransfer       DLInformationTransfer,
        ueCapabilityEnquiry         UECapabilityEnquiry,
        counterCheck                CounterCheck,
        mobilityFromNRCommand       MobilityFromNRCommand,
        dl-SegmentedMessage-r16     DL-SegmentedMessage-r16,
        spare6 NULL, spare5 NULL, spare4 NULL,
        spare3 NULL, spare2 NULL, spare1 NULL
    },
    messageClassExtension   SEQUENCE {}
}

-- TAG-DL-DCCH-MESSAGE-STOP
-- ASN1STOP

800

6.2.2 Message definitions

*-- Unmodified sections omitted --*

DL-SegmentedMessage

The *DL-SegmentedMessage* message is used to transfer one segment of any RRC messages allowed for transmission in the downlink direction using DCCH logical channel.

Signalling radio bearer: SRB1

RLC-SAP: AM

Logical channel: DCCH

Direction: Network to UE

*DL-SegmentedMessage message*

```
-- ASN1START
-- TAG-DL-SEGMENTEDMESSAGE-START

DL-SegmentedMessage-r16 ::=     SEQUENCE {
    criticalExtensions              CHOICE {
        dl-SegmentedMessage-r16         DL-SegmentedMessage-r16-IEs,
        criticalExtensionsFuture        SEQUENCE {}
    }
}

DL-SegmentedMessage-r16-IEs ::= SEQUENCE {
    segmentNumber                   INTEGER (0..63),
    rrcMessageType-r16              ENUMERATED {rrcReconfiguration, RRCResume,
                                        RRCRelease, RRCReestablishment,
                                        SecurityModeCommand, DLInformationTransfer,
                                        UECapabilityEnquiry, CounterCheck,
                                        MobilityFromNRCommand},
    rrc-SegmentedMessageContainer-r16   OCTET STRING,
    lastOfSegmentedMessageIndication    ENUMERATED {true}    OPTIONAL,
    nonCriticalExtension            SEQUENCE {}             OPTIONAL
}

-- TAG-DL-SEGMENTEDMESSAGE-STOP
-- ASN1STOP
```

| DL-DedicatedMessageSegment field descriptions |
|---|
| segmentNumber |
| Identifies the sequence number of a segment within the encoded DL DCCH message. |
| rrcMessageType |
| Indicates the RRC message to which this segmented DL DCCH message belongs to. |
| rrc-SegmentedMessageContainer |
| Includes a segment of the encoded DL DCCH message. The size of the included segment in this container should be less than or equal to 8898 bytes |
| lastOfSegmentedMessageIndication |
| Indicates whether the included DL DCCH message segment is the last segment of the upper layer message. |

FIG. 9

6.3.3 UE capability information elements

=== Unmodified sections omitted ===

– *UE-NR-Capability*

The IE *UE-NR-Capability* is used to convey the NR UE Radio Access Capability Parameters, see TS 38.306 [26].

UE-NR-Capability information element

=== Unmodified sections omitted ===

```
UE-NR-Capability-v1540       ::=    SEQUENCE {
    sdap-Parameters                    SDAP-Parameters                          OPTIONAL,
    overheatingInd                     ENUMERATED {supported}                   OPTIONAL,
    ims-Parameters                     IMS-Parameters                           OPTIONAL,
    fr1-Add-UE-NR-Capabilities-v1540   UE-NR-CapabilityAddFRX-Mode-v1540        OPTIONAL,
    fr2-Add-UE-NR-Capabilities-v1540   UE-NR-CapabilityAddFRX-Mode-v1540        OPTIONAL,
    fr1-fr2-Add-UE-NR-Capabilities     UE-NR-CapabilityAddFRX-Mode              OPTIONAL,
    nonCriticalExtension               UE-NR-Capability-v1550                   OPTIONAL
}

UE-NR-Capability-v1550       ::=    SEQUENCE {
    reducedCP-Latency                  ENUMERATED {supported}                   OPTIONAL,
    nonCriticalExtension               UE-NR-Capability-v1560                   OPTIONAL
}

UE-NR-Capability-v1560       ::=    SEQUENCE {
    nrdc-Parameters                    NRDC-Parameters                          OPTIONAL,
    receivedFilters                    OCTET STRING (CONTAINING UECapabilityEnquiry-v1560-
IEs)                               OPTIONAL,
    nonCriticalExtension               UE-NR-Capability-v16xy                   OPTIONAL
}

UE-NR-Capability-v16xy       ::=    SEQUENCE {
    dl-SegmentedMessageSupport-r16     ENUMERATED {supported}                   OPTIONAL,
    nonCriticalExtension               SEQUENCE {}                              OPTIONAL
}

UE-NR-CapabilityAddXDD-Mode  ::=    SEQUENCE {
    phy-ParametersXDD-Diff             Phy-ParametersXDD-Diff                   OPTIONAL,
    mac-ParametersXDD-Diff             MAC-ParametersXDD-Diff                   OPTIONAL,
    measAndMobParametersXDD-Diff       MeasAndMobParametersXDD-Diff             OPTIONAL
}

UE-NR-CapabilityAddXDD-Mode-v1530 ::= SEQUENCE {
    eutra-ParametersXDD-Diff           EUTRA-ParametersXDD-Diff
}

UE-NR-CapabilityAddFRX-Mode  ::= SEQUENCE {
    phy-ParametersFRX-Diff             Phy-ParametersFRX-Diff                   OPTIONAL,
    measAndMobParametersFRX-Diff       MeasAndMobParametersFRX-Diff             OPTIONAL
}

UE-NR-CapabilityAddFRX-Mode-v1540 ::= SEQUENCE {
    ims-ParametersFRX-Diff             IMS-ParametersFRX-Diff                   OPTIONAL
}

-- TAG-UE-NR-CAPABILITY-STOP
```

FIG. 10

4.2.2 General parameters

| Definitions for parameters | Per | M | FDD-TDD DIFF | FR1-FR2 DIFF |
|---|---|---|---|---|
| *delayBudgetReporting* Indicates whether the UE supports delay budget reporting as specified in TS 38.331 [9]. | UE | No | No | No |
| *inactiveState* Indicates whether the UE supports RRC_inactive as specified in TS 38.331 [9]. | UE | Yes | No | No |
| *overheatingInd* Indicates whether the UE supports overheating assistance information. | UE | No | No | No |
| *reducedCP-Latency* Indicates whether the UE supports reduced control plane latency as defined in TS 38.331 [9]. | UE | No | No | No |
| *splitSRB-WithOneUL-Path* Indicates whether the UE supports UL transmission via either MCG path or SCG path for the split SRB as specified in TS 37.340 [7]. The UE shall only set the bit in UE-MRDC-Capability-> generalParametersMRDC. It shall not set the FDD/TDD specific fields. | UE | Yes | No | No |
| *splitDRB-withUL-Both-MCG-SCG* Indicates whether the UE supports UL transmission via both MCG path and SCG path for the split DRB as specified in TS 37.340 [7]. The UE shall only set the bit in UE-MRDC-Capability-> generalParametersMRDC. It shall not set the FDD/TDD specific fields. | UE | Yes | No | No |
| *srb3* Indicates whether the UE supports direct SRB between the SN and the UE as specified in TS 37.340 [7]. The UE shall only set the bit in UE-MRDC-Capability-> generalParametersMRDC. It shall not set the FDD/TDD specific fields. This field is not applied to NE-DC. | UE | No | Yes | No |
| *v2x-EUTRA* Indicates whether the UE supports EUTRA V2X according to UE-EUTRA-Capability as defined in TS 36.331 [6], independent of the configured EN-DC band combination. This field is only applied to EN-DC. In UE-NR-Capability, this field is not used, and UE does not include the field. | UE | No | No | No |
| *dl-SegmentedMessageSupport* Indicates whether the UE supports RRC Segmentation in DL as defined in TS 38.331 [9]. | UE | No | No | No |

5.3.10.3 Detection of radio link failure

The UE shall:

1> upon T310 expiry in PCell; or

1> upon random access problem indication from MCG MAC while neither T300, T301, T304, T311 nor T319 are running; or 1> upon indication from MCG RLC that the maximum number of retransmissions has been reached:

2> if the indication is from MCG RLC and CA duplication is configured and activated, and for the corresponding logical channel *allowedServingCells* only includes SCell(s):

3> initiate the failure information procedure as specified in 5.7.5 to report RLC failure.

2> else:

3> consider radio link failure to be detected for the MCG i.e. RI  1300

3> discard any segments of segmented RRC messages received;

3> if AS security has not been activated:

4> perform the actions upon going to RRC_IDLE as specified in 5.3.11, with release cause 'other';

3> else if AS security has been activated but SRB2 and at least one DRB have not been setup:

4> perform the actions upon going to RRC_IDLE as specified in 5.3.11, with release cause 'RRC connection failure';

3> else:

4> initiate the connection re-establishment procedure as specified in 5.3.7.

The UE shall:

1> upon T310 expiry in PSCell; or

1> upon random access problem indication from SCG MAC; or

1> upon indication from SCG RLC that the maximum number of retransmissions has been reached:

2> if the indication is from SCG RLC and CA duplication is configured and activated; and for the corresponding logical channel *allowedServingCells* only includes SCell(s):

3> initiate the failure information procedure as specified in 5.7.5 to report RLC failure.

2> else:

3> consider radio link failure to be detected for the SCG, i.e. SCG RLF;

3> initiate the SCG failure information procedure as specified in 5.7.3 to report SCG radio link failure.

FIG. 13

APPARATUS AND METHODS FOR RESOURCE MESSAGE SEGMENTATION IN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to segmentation of messages which exceed a certain size such as e.g., radio resource control (RRC) messages in a downlink direction for 3GPP New Radio (NR) systems.

2. Description of Related Technology

NG-RAN or "NextGen RAN (Radio Area Network)" is part of the 3GPP "5G" next generation radio system. NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., a next-generation LTE eNB or "ng-eNB" which supports connectivity to both the EPC (Evolved Packet Core) and the NR "5GC" (5G Core Network).

As background, FIG. 1 shows the 5G architecture 100 and components thereof as defined in 3GPP TS 23.501 (FIG. 4.2.3-1 thereof).

FIG. 2 shows a prior art 5G gNB architecture, configured for RRC DL operation with one or more UEs.

5G NR key aspects were originally specified in 3GPP Release 15 NG-RAN (released in various phases e.g. "5G Phase 1", "5G Phase 2", and "5G Phase 3"), and are being further refined in follow-on Release 16 (and Release 17. For instance, low latency communication, beam-based channels, massive Multiple Input Output (MIMO) with large numbers of controllable antenna elements, scalable-width sub-channels, carrier aggregation, cloud Radio-Access Network (RAN) capability, network slicing, and coexistence with LTE were first specified in Release 15.

In both 3GPP Release 15 and 3GPP Release 16, the Radio Resource Control (RRC) protocol is a key control protocol used in the protocol stack of the Control Plane (CP) of NR, and has multiple layers (based on Open Systems Interconnection (OSI) layering). See 3GPP TS 38.300 V15.6.0 "NR and NG-RAN Overall Description, Stage 2 (Release 15)" dated June 2019, which is incorporated herein by reference in its entirety.

RRC messages are sent using Packet Data Convergence Protocol (PDCP), which has a specified limit (currently, 9000 bytes). See 3GPP TS 38.323 V15.6.0 "NR; Packet Data Convergence Protocol (PDCP) specification (Release 15)" dated June 2019, which is incorporated herein by reference in its entirety. If an upper layer message from a protocol such as RRC exceeds the PDCP limit of 9000 bytes, the message must be segmented.

As a brief aside, during the design of RRC (and other upper layer wireless protocols such as SDAP), care was taken by 3GPP to limit the message sizes of these protocols to be under the above limit of 9000 bytes. This was in effect a delicate "balancing act" between feature feasibility and performance. However, as the list of required UE features grew, so grew the UE capabilities (provided by the UE to the network). This in turn placed additional burden on the PDCP protocol. As an example, 3GPP Release 16 placed a requirement to support up to 65,536 bytes worth of such UE capabilities. It was not possible to accommodate such a large RRC message as a PDCP SDU. And, historically Radio Resource Control or "RRC" (being the control plane protocol that it is) was designed for one-shot delivery/reception and processing by both the transmitting and receiving nodes.

Accordingly, it was decided for 3GPP Release 16 to deliver a mechanism in NR to perform segmentation of RRC messages; i.e., breaking up of a monolithic RRC message into multiple segments, with each segment sent via individual PDCP message, in a generic manner. See R2-1905501, RAN2 #105bis Meeting Report dated April 2019, which is incorporated herein by reference in its entirety.

FIG. 3 illustrates a prior art approach to RRC message handling. In this simplified representation (a generic high-level logic diagram shown from a PDCP layer perspective), a message such as a Service Data Unit or SDU (e.g., RRC message) is evaluated within the protocol stack for size relative to a prescribed limit (e.g., 9000 bytes) per step 301. If at step 303 the message exceeds the limit, an error handling routine is invoked per step 309, which may for example include discarding the SDU, and transmission of an error message or a retransmission request with an error code. The processing of FIG. 3 is not optimized, and not suited to handling the more expansive requirements of e.g., Release 16 discussed above.

As a brief aside, there are a number of possible different instances or types of SDUs (e.g., RRC messages having different functions, such as e.g., RRCSetupRequest as described in 3GPP TS 38.331) that must be accommodated; hence, the logic of FIG. 3 may apply to each of these different types of messages irrespective of their individual type; i.e., if they exceed 9000 bytes, they may be discarded. As such, a whole "class" of messages are at risk for error handling under the foregoing prior art approach, depending on their size.

Accordingly, improved apparatus and methods are needed to, inter alia, handle segmentation of SDUs such as RRC messages in a downlink direction in wireless systems, including those compliant with 5G NR standards. Ideally, such improved apparatus and methods would be able to process classes of SDUs (i.e., generically), as opposed to e.g., having particular rules specific to each individual instance of a message type.

SUMMARY

The present disclosure addresses the foregoing needs by providing, inter alia, methods and apparatus for segmentation of control messages, such as for e.g., radio resource control (RRC) messages in a downlink direction for New Radio (NR) systems.

In one aspect, the disclosure provides methods and apparatus for downlink RRC segmentation in a generic manner, supported by a 5G gNB and 5G-capable user equipment (UE).

In another aspect, the disclosure provides methods and apparatus for downlink RRC segmentation in a generic manner, supported by a 4G/4.5 eNB and 4G/4.5G-capable user equipment (UE).

In a further aspect, a computerized method for control message processing within a wireless user device is disclosed. In one embodiment, the wireless user device is configured for wireless communication with a wireless access node, and the computerized method includes: receiving a plurality of message segments belonging to a control message sent from the wireless access node; determining that the plurality of message segments comprise a complete control message; and based on the receiving, utilizing the plurality of segments to assemble the control message; and decoding the assembled control message.

In one variant, the control message includes downlink (DL) Radio Resource Control (RRC) message of a 5G New Radio (NR) system; and the receiving a plurality of message segments includes receiving the plurality of message segments on a DL Dedicated Control Channel (DCCH). In one implementation thereof, the plurality of message segments on a DL Dedicated Control Channel (DCCH) includes receiving the plurality of message segments using at least protocol which has maximum message size limit, the control message having been segmented based on the size limit before transmission thereof to the wireless user device.

In another variant, the method further includes, based on the detection of a radio link failure, causing removal of the plurality of message segments from a storage apparatus.

In yet another variant, the receiving of the plurality of segments includes receiving the plurality of message segments as part of a container structure.

In a further variant, the method further includes: assigning each of the plurality of message segments an associated segment number; and identifying each of the plurality of message segments based at least on the respective segment numbers associated therewith. In one implementation thereof, the method further includes receiving data indicative that one of the plurality of message segments is a last one of the plurality of segments to be received.

In another aspect, a wireless user device is disclosed. In one embodiment, the device includes: a digital processor apparatus; a wireless network interface in data communication with the digital processor apparatus; and a computer readable storage medium in data communication with the digital processor apparatus, the computer readable storage medium including at least one computer program. In one variant, the at least one computer program is configured to, when executed on the digital processor apparatus, cause the wireless user device to: cause transmission of a capabilities information element to a wireless access node of a wireless network via the wireless network interface, the capabilities information element comprising data indicative that the wireless user device is capable of reception and processing of segmented control messages; receive via a control channel established between the wireless user device and the wireless access node, a plurality of segments of a control message transmitted from the wireless access node; and either: (a) based at least on receipt of a particular one of the plurality of segments and data indicative that the particular one is a last segment of the control message, assemble the control message from the plurality of segments, and process the assembled RRC message; or (b) based at least on lack of receipt of the last segment of the control message within a prescribed time period, cause discard of the received plurality of segments.

In one implementation, at least one computer program is further configured to, when executed on the digital processor apparatus, cause the wireless user device to: receive, from the wireless access node, data representative of a request for the capabilities information element from the wireless user device; and based on the request for the capability information, cause the transmission of the capabilities information element. The capabilities information element further includes e.g., one or more parameters relating to the reception and processing of segmented control messages. For instance, the one or more parameters comprise at least of a maximum number of segments the wireless user device is capable of receiving.

In another implementation, at least one computer program is further configured to, when executed on the digital processor apparatus, cause the wireless user device to: receive a second plurality of segments of a second control message; and receive data indicative that (i) individual ones of the plurality of segments belong to the control message, and (ii) individual ones of the second plurality of segments belong to the second control message.

In another aspect, a method of RRC message processing is disclosed. In one embodiment, a message comprising a plurality of segments is received in a sequential fashion (e.g., each segment one-by-one) by a receiving UE, and the method includes: storing a first received segment at a first time; receiving and storing at least a second received segment at a second, subsequent time; and processing the first and at least second stored message segments to generate the reconstructed message. In one variant, the message comprises an RRC message having a total length in excess of 9000 bytes.

In yet another aspect of the disclosure, computer readable apparatus comprising a storage medium is described. In one embodiment, the storage medium includes at least one computer program comprising a plurality of instructions which are configured to, when executed on a digital processor apparatus of a computerized network wireless access node, cause the computerized network wireless access node to: transmit to a wireless user device data representative of a request for capability information; based on the request for the capability information, receive at least data indicative that the wireless user device supports receipt of segmented resource control messages in a downlink direction; based at least on the received at least data, cause generation of a plurality of segments for one or more resource control messages; and transmit the plurality of segments to the wireless user device for assembly thereby.

In one variant, the data indicative that the wireless user device supports the receipt of the segmented resource control messages in the downlink direction includes receipt of non-critical message extension.

In another variant, the plurality of instructions are further configured to, when executed on the digital processor apparatus, cause the computerized network wireless access node to, based on the request for the capability information, receive data representative of parameters relating to the support by the wireless user device of the receipt of the segmented resource control messages in the downlink direction, the parameters comprising at least a maximum number of segments that the wireless user device is allowed to receive. Transmission of the plurality of segments includes transmission of a number of segments at or below the maximum number in one implementation.

In a further variant, the plurality of instructions are further configured to, when executed on the digital processor apparatus, cause the computerized network wireless access node to encode the plurality of segments in a container format. In one implementation, (i) the transmission of the plurality of segments to the wireless user device includes transmission of the plurality of segments in the container format, and (ii) the container format enables the wireless user device to identify a last one of the plurality of segments with respect to a sequence.

In one configuration of the foregoing, each of the plurality of segments are designated by a segment number, and the respective segment numbers of the plurality of segments enable the wireless user device to assemble the one or more RRC messages in accordance with the sequence.

In another variant of the computer readable apparatus, the one or more resource control messages comprise at least two resource control messages; each of the plurality of segments are associated with a message type; and the respective message types associated with the plurality of segments indicate to which of the at least two resource control messages individual ones of the plurality of segments belong.

In a further variant, the computerized network wireless access node includes a 5G Node B (gNB); the one or more resource control messages comprise RRC (radio resource control) messages; and the transmission of the plurality of segments to the wireless user device for assembly thereby includes scheduled transmission on a downlink DCCH (dedicated control channel).

In a further aspect of the disclosure, a method for supporting segmentation of one or more radio resource control (RRC) messages in a downlink direction for a 5G New Radio (NR) system is described. In one embodiment, the method includes receiving a plurality of segments belonging to a RRC message; based on the receiving, utilizing the plurality of segments to assemble the RRC message; and processing the assembled RRC message.

In one variant, the method further includes, based on the detection of a radio link failure, causing removal of the plurality of segments from a storage apparatus.

In yet another variant, the receiving of the plurality of segments includes receiving segments that are carried in a container. In one implementation, the container includes a modified rrc-SegmentedMessageContainer.

In yet a further variant, each of the plurality of segments is associated with a segment number, and the method further includes identifying each of the plurality of segments based on the respective segment numbers associated therewith. In one implementation, each segment (i.e. each DL-SegmentedMessage) is identified via a segment number (i.e., segmentNumber).

In yet another variant, the method further includes receiving data indicative that one of the plurality of segments is a last one of the plurality of segments to be received. In one implementation, a container (rrc-SegmentedMessageContainer) carrying the last segmented message is identified using an identifier (e.g., lastOfSegmentedMessageIndication). The last segment of a segmented message is identified in one approach by setting lastOfSegmentedMessageIndication to a value of "true."

In another variant, a maximum number of segments allowed to be received is specified. In one implementation, the maximum number of segments (via e.g., segmentNumber) is restricted to 32.

In another aspect of the disclosure, a network apparatus for use in a wireless network is disclosed. In one embodiment, the network apparatus includes: a digital processor apparatus; a wireless network interface in data communication with the digital processor apparatus; and a computer readable storage medium in data communication with the digital processor apparatus. In one variant, the computer readable storage medium includes at least one computer program which is implemented to, when executed on the digital processor apparatus, cause the network apparatus to: generate a plurality of segments of a control message; designate a particular one of the plurality of segments (and data indicative thereof) as a last segment of the control message; and cause transmission of the segments and data via a wireless interface to a wireless user device.

In one variant, the wireless network is configured as a 3GPP 5G NR compliant network, the network apparatus includes a gNB, the user device includes a UE, the control message includes an RRC (Radio Resource Control) message, and the interface includes a Uu interface.

In another aspect, a wireless user device is disclosed. In one embodiment, the wireless user device includes: a digital processor apparatus; a wireless network interface in data communication with the digital processor apparatus; and a computer readable storage medium in data communication with the digital processor apparatus. In one variant, the computer readable storage medium includes at least one computer program which is implemented to, when executed on the digital processor apparatus, cause the wireless user device to: receive a plurality of segments of a control message (such as e.g., the aforementioned RRC message); based on receipt of a particular one of the plurality of segments and data indicative that the particular one is a last segment of the RRC message, assemble the RRC message from the plurality of segments; and process the assembled RRC message.

In one implementation, the at least one computer program is further configured to, when executed on the digital processor apparatus, cause the wireless user device to: receive, from a 5G base station apparatus, data representative of a request for capability information of the wireless user device; and based on the request for the capability information, transmit to the 5G base station apparatus an information element (IE), the IE comprising at least data indicative of support for receiving segmented RRC messages in a downlink direction. In a further implementation, parameters for the support may be indicated.

Specifically, in further implementations, the introduction of a UE capability indicating support for receiving segmented RRC messages in the downlink direction is enabled by providing a parameter (e.g., dl-SegmentatedMessageSupport).

In another aspect, computer readable apparatus is disclosed. In one embodiment, the computer readable apparatus includes a storage medium having at least one computer program stored thereon. In one variant, the at least one computer program includes a plurality of instructions which are implemented to, when executed on a digital processor apparatus, cause a computerized wireless access device to: transmit to a wireless user device data representative of a request for capability information; based on the request for the capability information, receive at least data indicative that the wireless user device supports receipt of segmented control (e.g., RRC) messages in a downlink direction; based on the received data, generate a plurality of segments for one or more control messages; and transmit the plurality of segments to the wireless user device for assembly thereby.

In one implementation, the one or more control (e.g., RRC) messages include at least two RRC messages; each of the plurality of segments are associated with a message type; and the respective message types associated with the plurality of segments indicate to which of the at least two RRC messages individual ones of the plurality of segments belong. For instance, an "rrcMessageType" field or data is used to indicate to which RRC message a particular segment (i.e. each "DL-SegmentedMessage") belongs.

In a further aspect, a system is disclosed. In one embodiment, the system includes at least one wireless access node, and a plurality of user wireless devices capable of transacting segmented control protocol messages with the access node. In one variant, the node includes a 3GPP 5G NR compliant gNB, and the user devices include UEs which include the ability to receive segmented control messages and process them for e.g., reassembly.

In a further aspect, methods and apparatus for determining whether control message segments received should be assembled are disclosed. In one embodiment, the control message segments are RRC message segments, and the methods and apparatus are configured to determine whether all segments associated with a given message have been received, and only then assemble the segments to form a complete message.

In yet a further aspect, methods and apparatus for determining whether control message segments received should be discarded are disclosed. In one embodiment, the control message segments are RRC message segments, and the methods and apparatus are configured to determine whether a radio link failure has occurred, and if so any segments associated with a given message that have been received are discarded.

In another aspect, methods and apparatus for sending one or more segments of a segmented control message are disclosed. In one embodiment, a DL-SegmentedMessage is used to transmit the one or more segments in the DL using a DCCH logical channel. In one implementation, the DL-SegmentedMessage is comprised of: (i) a segment number field (e.g., segmentNumber), (ii) a message type field (e.g., rrcMessageType), (iii) a segment of the encoded DL message (e.g., rrc-SegmentedMessageContainer field), (iv) a segment placement field (e.g., lastOfSegmentedMessageIndication).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In a further aspect, a system for segmented resource or control message exchange within a wireless network is disclosed. In one embodiment, the system includes one or more wireless access nodes configured to segment DL messages according to a segmentation protocol, and one or more wireless user device configured to receive the message segments individually (e.g., via a container structure) and reassemble the message from the segments and decode the message.

In yet another aspect, a message segmentation protocol is disclosed. In one embodiment, the protocol is configured for use on a downlink control channel in a wireless system, and includes a containerization format and a segmentation format which enable e.g., control or resource messages of certain sizes to be segmented into constituent pieces and transmitted via the containerization format, including with data indicating which segment is the last of the pieces.

In yet another aspect, methods and apparatus for generic message handling and segmentation are disclosed. In one embodiment, the methods and apparatus are configured to enable handling of entire classes of messages (e.g., all RRC messages or SDUs) irrespective of their particular function, thereby enabling inter alia, common handling of all large messages within a given class or type.

These and other aspects shall become apparent when considered in light of the disclosure provided herein.

BRIEF DESCRIPTION OF THE DRAWINGS

FIG. 8 is a tabular representation of one embodiment of a downlink (DL) DCCH message format according to the present disclosure.

FIG. 9 is a tabular representation of one embodiment of a control message definition (i.e., for a segmentation message) according to the disclosure.

FIG. 10 is a tabular representation of one embodiment of a user device (e.g., UE) capability information element (IE) according to the present disclosure.

FIG. 12 is a tabular representation of one embodiment of a general parameter set including segmentation message support parameter, for an exemplary user device configured according to the present disclosure.

FIG. 13 is a graphical representation showing one embodiment of a link failure detection and segmented message handling protocol according to the present disclosure.

FIGS. 2-18 © Copyright 2019-2020 Charter Communications Operating, LLC. All rights reserved. Other Figures© Copyright of their respective copyright holders.

DETAILED DESCRIPTION

Figure 1:
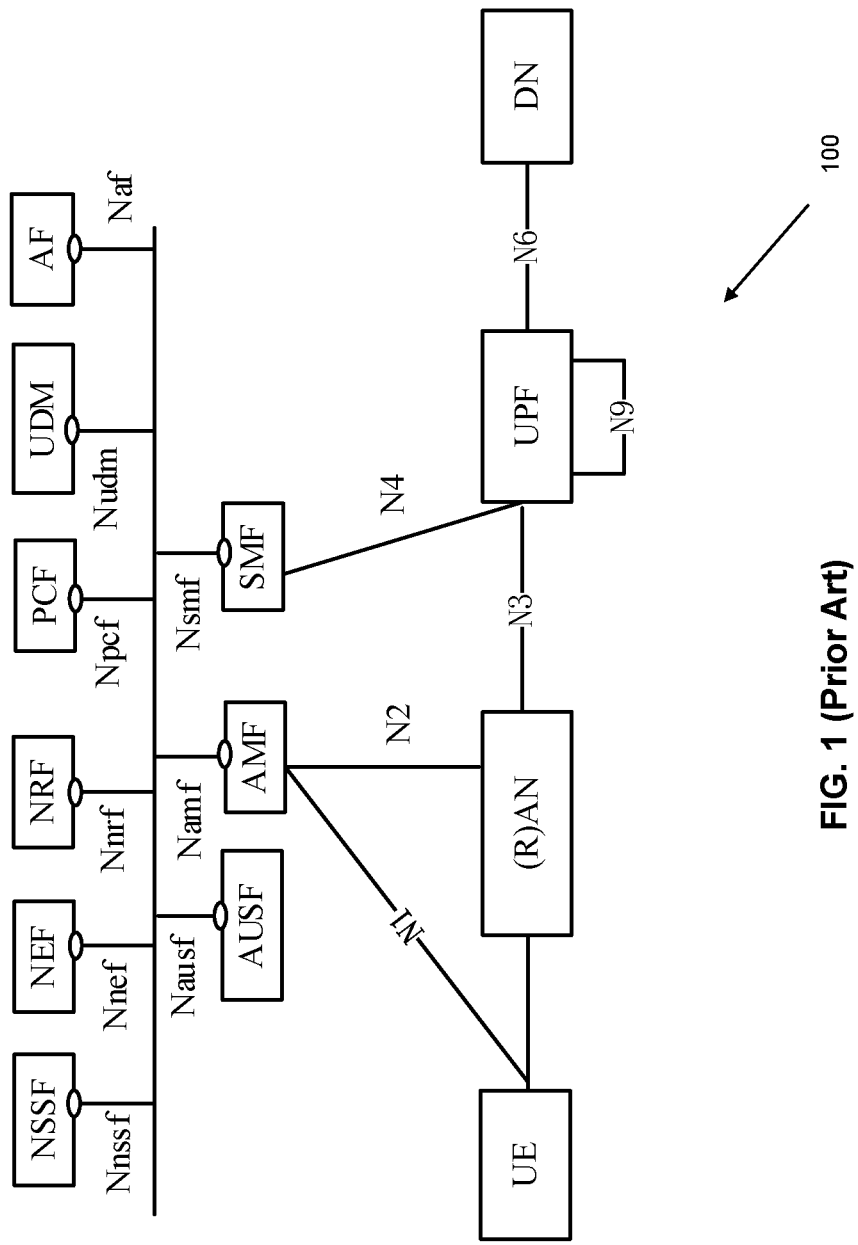
FIG. 1 is a functional block diagram of a prior art 5G system architecture and the various components thereof.
Figure 2:
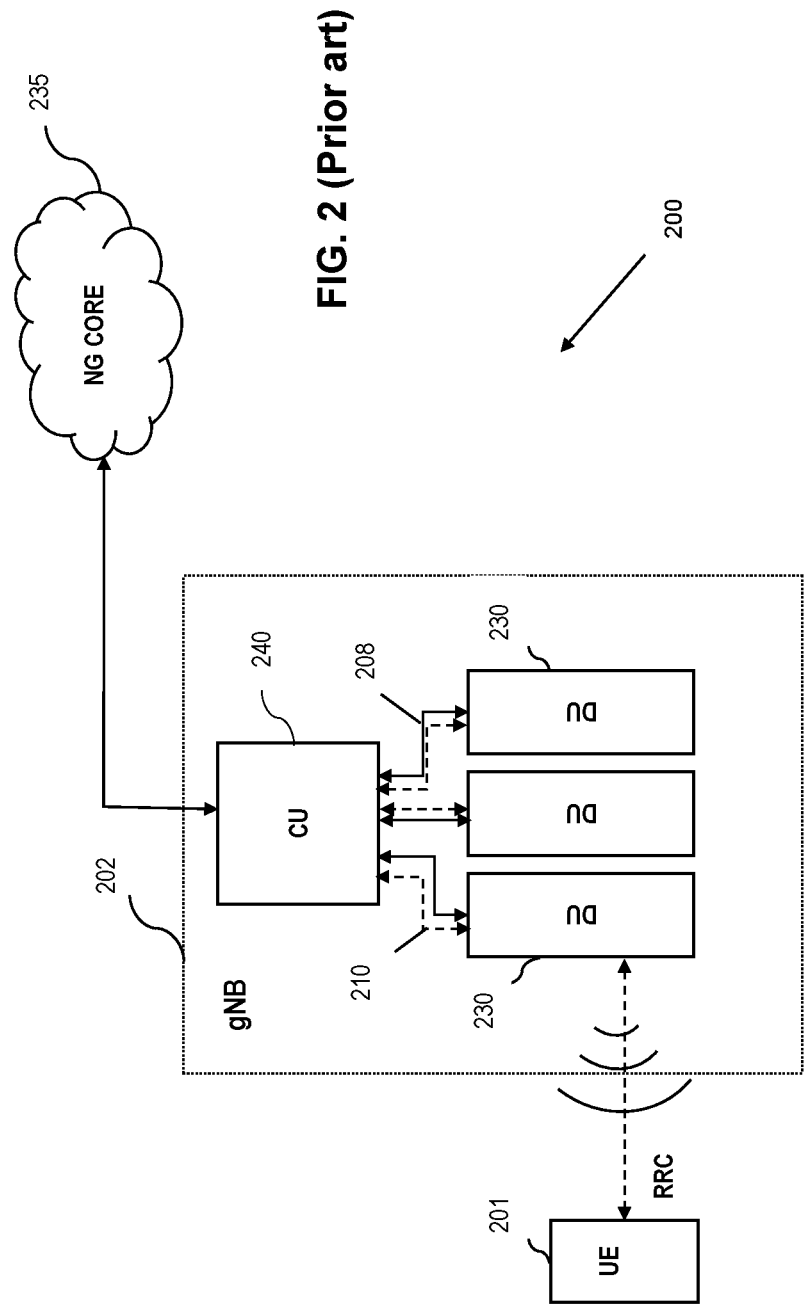
FIG. 2 is a block diagram illustrating a prior art 3GPP 5G gNB architecture including CU and multiple DU.
Figure 3:
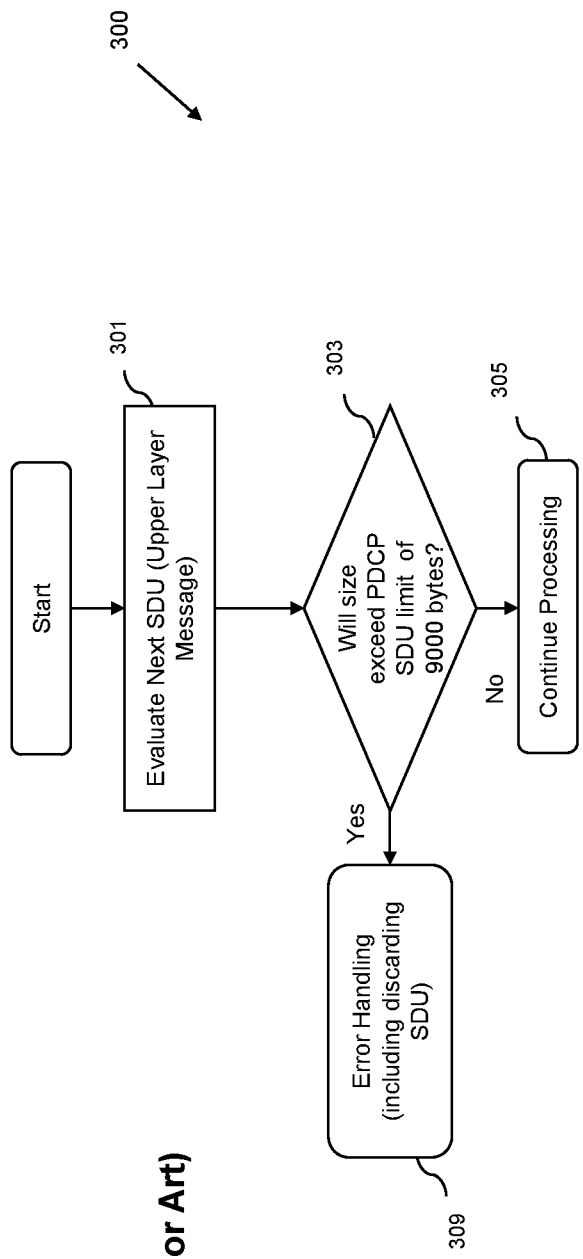
FIG. 3 is a logical flow diagram illustrating a prior art SDU (e.g., RRC) message handling routine.

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, wireless nodes such as FWA devices or femtocells/small-cells, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Ruby, Python, and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, VoLTE (Voice over LTE).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), GPUs, reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "mmWave" refers to, without limitation, any device or technology or methodology utilizing millimeter wave radio spectrum.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15 (Rel-15), and any modifications, subsequent Releases (including e.g., Rel-16 and Rel-17), or amendments or supplements thereto which are directed to New Radio technology, whether licensed or unlicensed.

As used herein, the term "quasi-licensed" refers without limitation to spectrum which is at least temporarily granted, shared, or allocated for use on a dynamic or variable basis, whether such spectrum is unlicensed, shared, licensed, or otherwise.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the terms "unlicensed" and "unlicensed spectrum" refer without limitation to radio frequency spectrum (e.g., from the sub-GHz range through 100 GHz) which is generally accessible, at least on a part time basis, for use by users not having an explicit or exclusive license to use, such as e.g., ISM-band, 2.4 GHz bands, 5 GHz bands, 6 GHz bands, quasi-licensed spectrum such as CBRS, 60 GHz (V-Band) and other mmWave bands, 5G NR-U bands, and others germane to the geographic region of operation (whether in the U.S. or beyond) that will be appreciated by those of ordinary skill given the present disclosure.

As used herein, the term "Wi-Fi" refers to, without limitation and as applicable, any of the variants of IEEE Std. 802.11 or related standards including 802.11 a/b/g/n/s/v/ac/ax/ay/ba, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "xNB" refers to any 3GPP-compliant node including without limitation eNBs (EUTRAN) and gNBs (5G NR).

Overview

In one exemplary aspect, the present disclosure provides improved methods and apparatus for handling segmentation of one or more control messages in a wireless system, such as e.g., Radio Resource Control (RRC) messages transmitted via a downlink within a 3GPP 5G New Radio (NR) system. In particular embodiments, the present disclosure provides inter alia, mechanisms for (i) enabling RRC segmentation of control messages in the downlink direction (including in a generic manner), and (ii) message and information exchanges between a UE (such as a segmentation-enabled or enhanced UE) and a network access node such as a gNB. Advantageously, these mechanisms can be applied for handling of the segmentation of such RRC messages in the downlink direction in a generic manner (i.e., for segmentation of any current or future RRC messages or other SDUs such as SDAP SDUs.

In the exemplary 5G NR network implementation described herein, RRC messages are sent using the Packet Data Convergence Protocol (PDCP) using a DL-Dedicated Control Channel (DCCH); messages can advantageously be transmitted from the gNB to the enhanced UE (UEe) for RRC message(s) with sizes in excess of 9000 bytes. The UEe receives the segmented RRC message and assembles it utilizing the received segments. In one variant, a new message (e.g., DL-SegmentedMessage-r16) is introduced and transmitted by the segmentation-enabled gNB to the UEe in order to provide the segments to the UEe for assembly and decoding.

In various implementations, the new message (DL-SegmentedMessage-r16) may include one or more definitions and/or parameters. For example, the new message may include one or more of the following: (i) identification of each segment (i.e. each DL-SegmentedMessage) via a segment number; (ii) the RRC message to which a particular segment belongs to via rrcMessageType; (iii) restriction on the maximum number of segments allowed to a certain number (e.g., 32); and (iv) indication that a segmented message is the last message of a particular segment identified via a container (e.g., via a new container such as rrc-SegmentedMessageContainer) to carry the segmented message.

In another variant, UE capability data (e.g., via an information element (IE)) is provided to indicate to the segmentation-enabled gNB (gNBe) that the UEe(s) supports receiving segmented RRC messages in the downlink direction.

Method and apparatus to allow the UEe to discard received segments during a link failure are also disclosed, as are 4G/4.5G (i.e., LTE/LTE-A) based variants.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs or eNBs) associated with or supported at least in part by a managed network of a service provider (e.g., MSO and/or MNO networks), other types of radio access technologies ("RATs") and/or other types of networks and architectures that are configured to deliver digital data (e.g., text, images, games, software applications, video and/or voice/audio) may be used consistent with the present disclosure. Such other networks or architectures may be broadband, narrowband, or otherwise, the following therefore being merely exemplary in nature.

It will also be appreciated that while described generally in the context of networks providing service to a customer or consumer or end user or subscriber (i.e., within a prescribed service area, venue, or other type of premises), the present disclosure may be readily adapted to various types of environments including, e.g., within an enterprise domain (e.g., businesses), or even governmental uses. Yet other applications are possible.

Moreover, the various aspects of the disclosure may be utilized consistent with various types of radio frequency spectrum (as well as the underlying RAT technologies), including licensed, unlicensed (e.g., LTE-U or LTE-LAA, or NR-U), or "quasi-licensed" spectrum such as CBRS spectrum, or even mmWave (e.g., such as 52.6-71 GHz ostensibly specified by 3GPP Release-17). Such spectrum types may be mixed as well, such as where a small-cell based network operates with unlicensed or quasi-licensed spectrum, and the macrocell network utilizes licensed spectrum.

Other features and advantages of the present disclosure will immediately be recognized by persons of ordinary skill in the art with reference to the attached drawings and detailed description of exemplary embodiments as given below.

Methods

Figure 4:
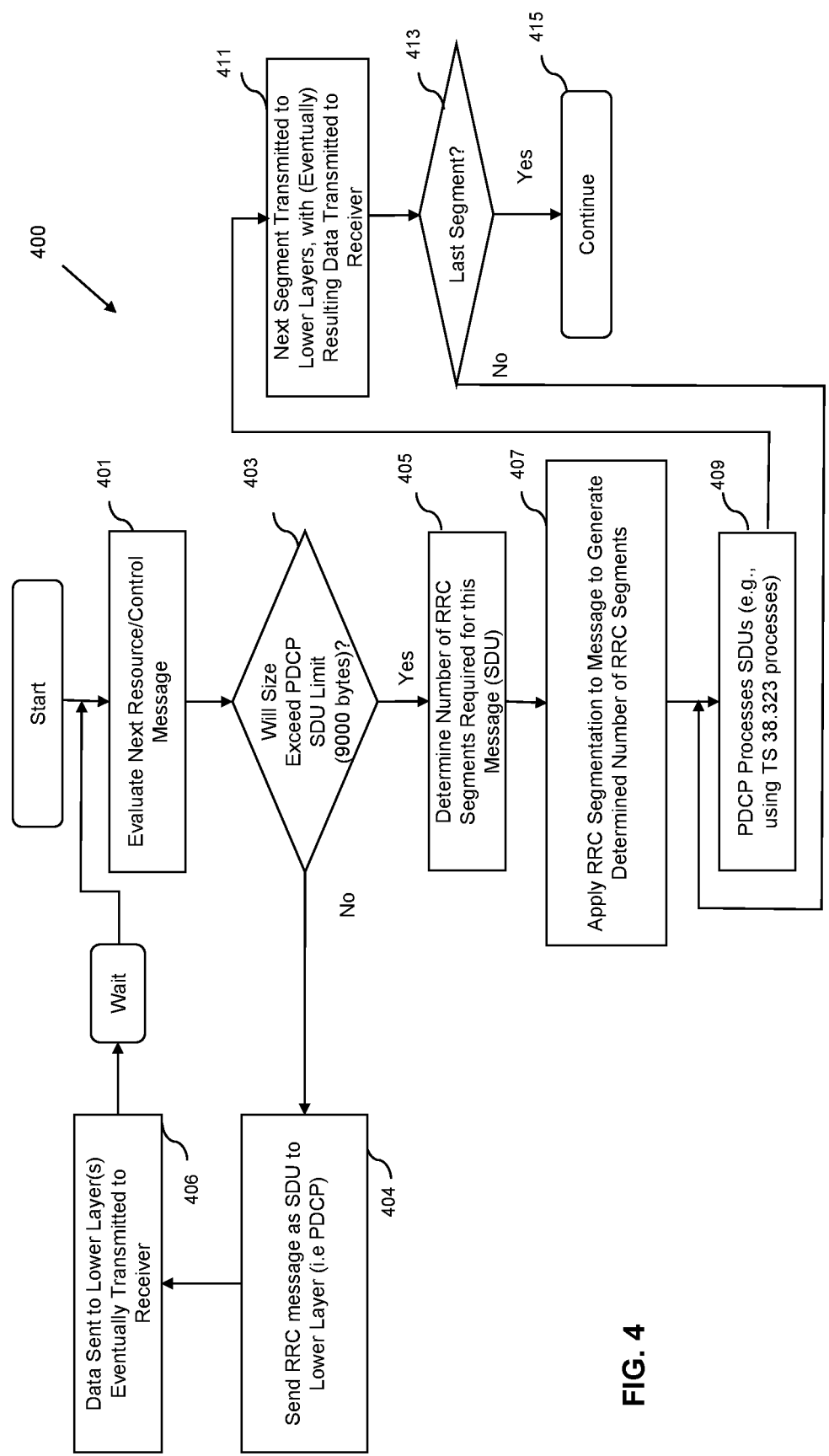
FIG. 4 is a logical flow diagram illustrating one embodiment of a generalized method of control message processing by a wireless access node according to the present disclosure.

FIG. 4 is a logical flow diagram illustrating one embodiment of a generalized method of control message processing by a wireless access node (e.g., enhanced gNB) according to the present disclosure. As shown, the method 400 includes first evaluating the next resource/control message to be issued by the gNBe per step 401. This evaluation may include determination of the channel on which the message is to be scheduled (e.g., DCCH or other), as well as the total size of the message (or prescribed portions thereof), such as the aforementioned 9000 bytes limit.

Per step 403, it is determined, based on the evaluation, whether segmentation of the message is required. This determination can be based on the evaluation of step 401, as well as other information, such as whether the target UE/UEe has message segmentation capability, as discussed in greater detail elsewhere herein. As shown in FIG. 4, this evaluation may e.g., comprise determination of whether the PDCP SDU size limitation (900 bytes) will be exceeded.

If segmentation is not required, then per step 404, the SDU (e.g., RRC message) is sent to the lower layer (e.g., PDCP), and eventually transmitted to the receiver (step 406). A wait or timeout state is then entered, or a counter is incremented (not shown), and the method 400 returns to evaluation of the next message queued (if any).

Alternatively, if segmentation is required per step 403, then the number of segments is determined for the SDU per step 405, and segmentation is applied to the gNB per step 407 so as to generate the determined number of (e.g., RRC) segments.

Per step 409, the PDCP layer processes the SDUs generated in step 407, such as via extant processing protocols as specified in 3GPP TS 38.323.

Per step 41, the processed message segments and any associated data are transmitted to the target UEe via the lower layers of the transmitter protocol stack, such as via the container and (e.g., dynamically) scheduled DCCH.

Per step 413, if the most recent segment processed and transmitted comprises the last segment of the (segmented) original message, then the method proceeds to step 415 where operation continues. If not the last segment, then the method returns to step 409 for processing of the next sequential segment.

Figure 4A:
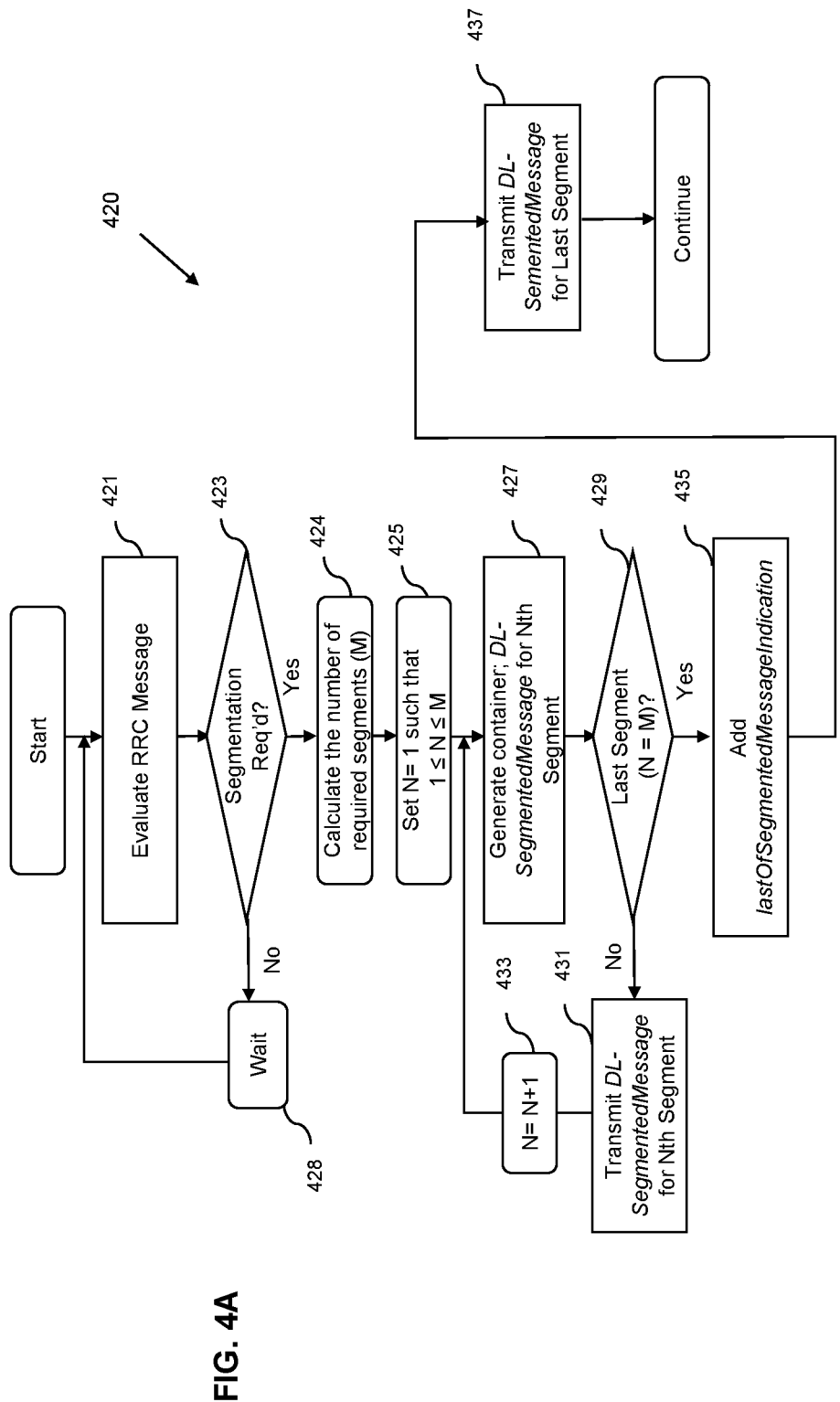
FIG. 4A is a logical flow diagram illustrating one implementation of the generalized method of FIG. 4.

FIG. 4A is a logical flow diagram illustrating one implementation of the generalized method of FIG. 4 (with only the relevant logic of the RRC and PDCP layers shown for brevity).

In this implementation 420, the message (e.g., an RRC message) is first evaluated per step 421 such as for size, and the need for segmentation determined per step 423 similar to described above with respect to FIG. 4. If no segmentation, then per step 428, the process proceeds to the next queued message (if any).

If segmentation is required, then per step 424, the number of required segments (M) is determined, and per step 425, a counter is set (e.g., 1≤N≤M), and the DL-SegmentedMessage for Nth segment is generated per step 427, including the fields shown in FIG. 9 herein (i.e., segment number, message type, and container with segment of e.g., 8996 bytes or less).

Per step 429, it is determined for each segment whether that is the last segment (i.e., N=M), and if not, the method proceeds to step 431, wherein the generated segment (message) is transmitted to the UEe on the DCCH. The counter (N) is incremented per step 433, and the next DL-SegmentedMessage for the Nth segment (now incremented) is generated per step 427. This process proceeds until the last segment of a given message is identified, wherein per step 435 the lastOfSegmentedMessageIndication field is populated with "true" to indicate the last segment, and then the last segment is transmitted to the UEe per step 437.

Figure 4B:
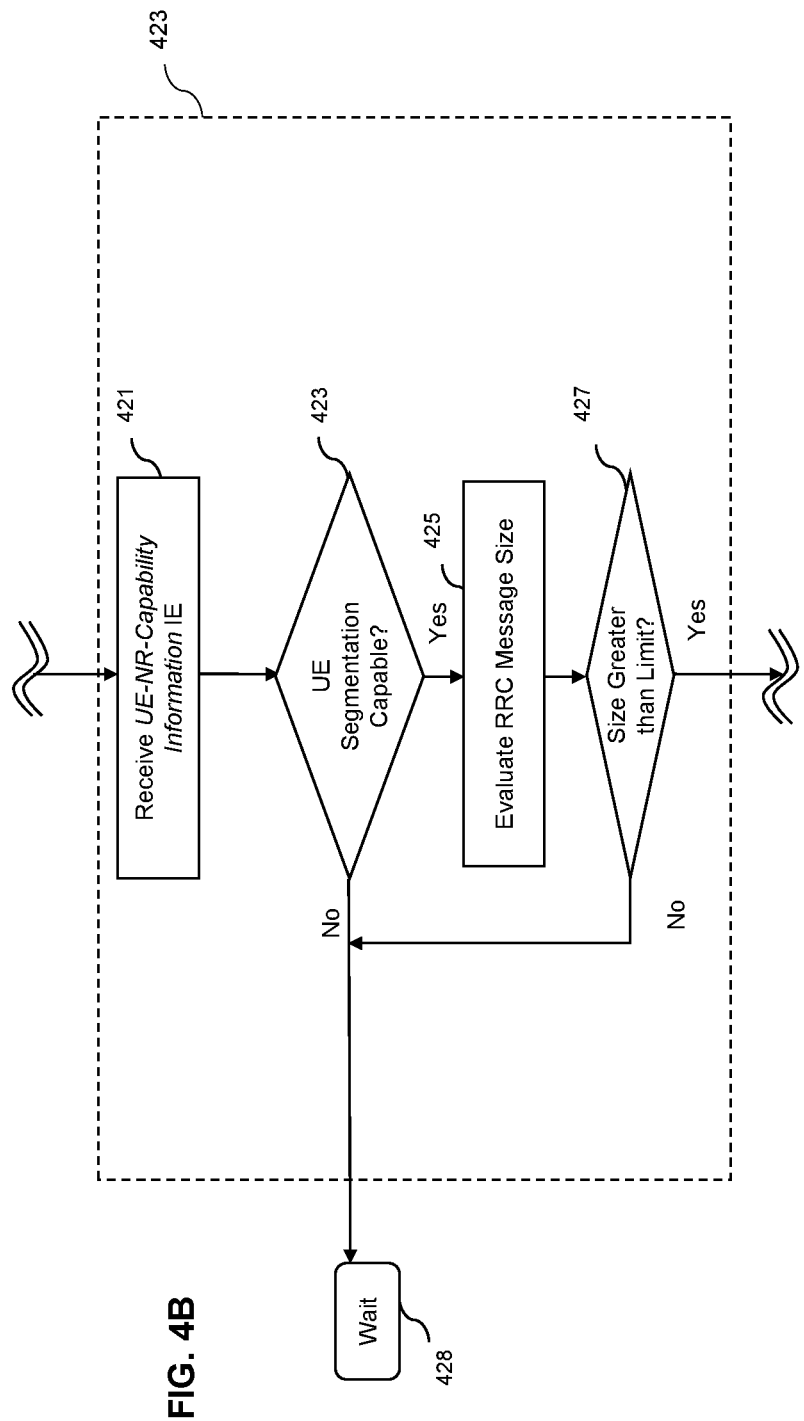
FIG. 4B is a logical flow diagram illustrating one implementation of the method of FIG. 4A.

FIG. 4B is a logical flow diagram illustrating one implementation of the method of FIG. 4A; particularly, step 423. As shown, the gNBe receives the UE-NR-CapabilityInformation IE at step 421, and decodes the received IE to determine if the UE or UEe it is conversant with is segmentation capable (see discussion of FIGS. 10-11) per step 423. If not, then the method proceeds back to the wait or counter increment step 428. If the UE is segmentation enabled (i.e., is a UEe), then per step 425 the RRC message size is evaluated, and if greater than the limit of 9000 bytes, segmentation is performed as previously described. If not, then segmentation need not be utilized by the gNBe in this instance even though the UEe is capable of it.

Figure 5:
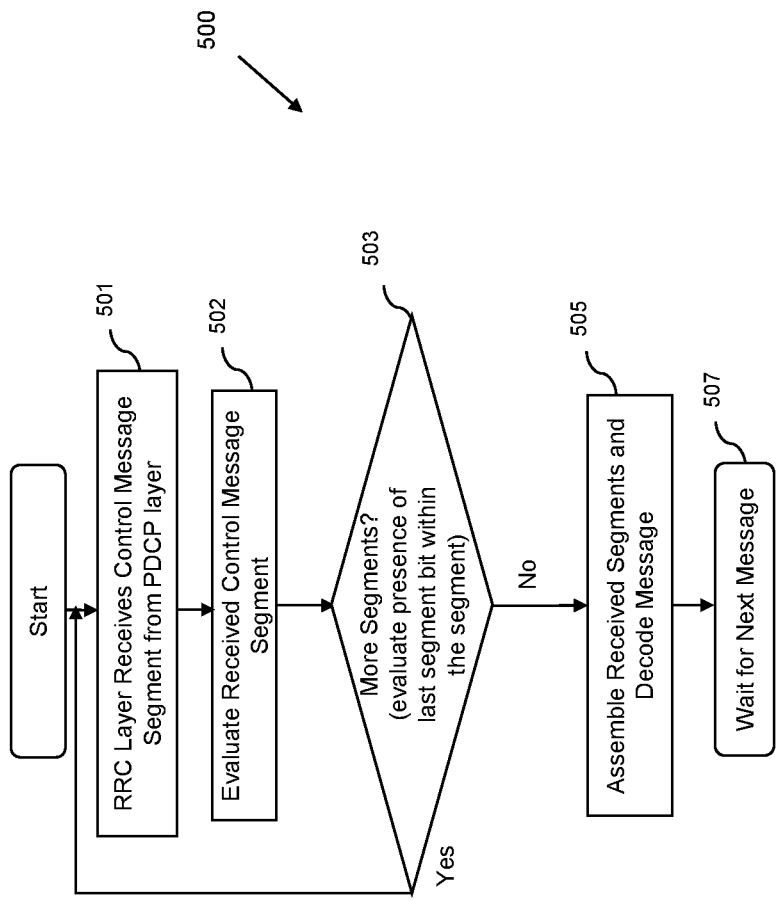
FIG. 5 is a logical flow diagram illustrating one embodiment of a generalized method of control message processing by a wireless user device according to the present disclosure.

FIG. 5 is a logical flow diagram illustrating one embodiment of a generalized method 500 of control message processing by a wireless user device according to the present disclosure (shown from an RRC layer perspective). As shown, the method 500 includes the user device (e.g., UEe) first receiving via the RRC layer, from the PDCP layer of the UEe), an Nth segment (e.g., DL-SegmentedMessage) associated with an Mth resource/control message per step 501, such as via the DL-DCCH. The UEe next evaluates the received (segment) message per step 502, and if it is determined to be the last segment (step 503), the UEe then assembles the Mth message from any other segments it has for the Mth message (i.e., by placing them in sequence based on sequence number) per step 505, and decodes the message. In one embodiment, the determination of whether the received segment is the last message of step 503 is conducted by determining whether a prescribed bit (i.e., a "last segment bit") is present within the segment. Other approaches may be used as well, consistent with the present disclosure.

At step 507, if no other resource/control messages or segments are received, the UEe enters a wait state at step 513. Alternatively, if there are additional e.g., RRC messages queued or segments received (e.g., for an M+1th message), then the method increments the M counter at step 511, and proceeds to receive, assemble and decode the M+1th message similar to the procedure used for the Mth message.

Figure 5A:
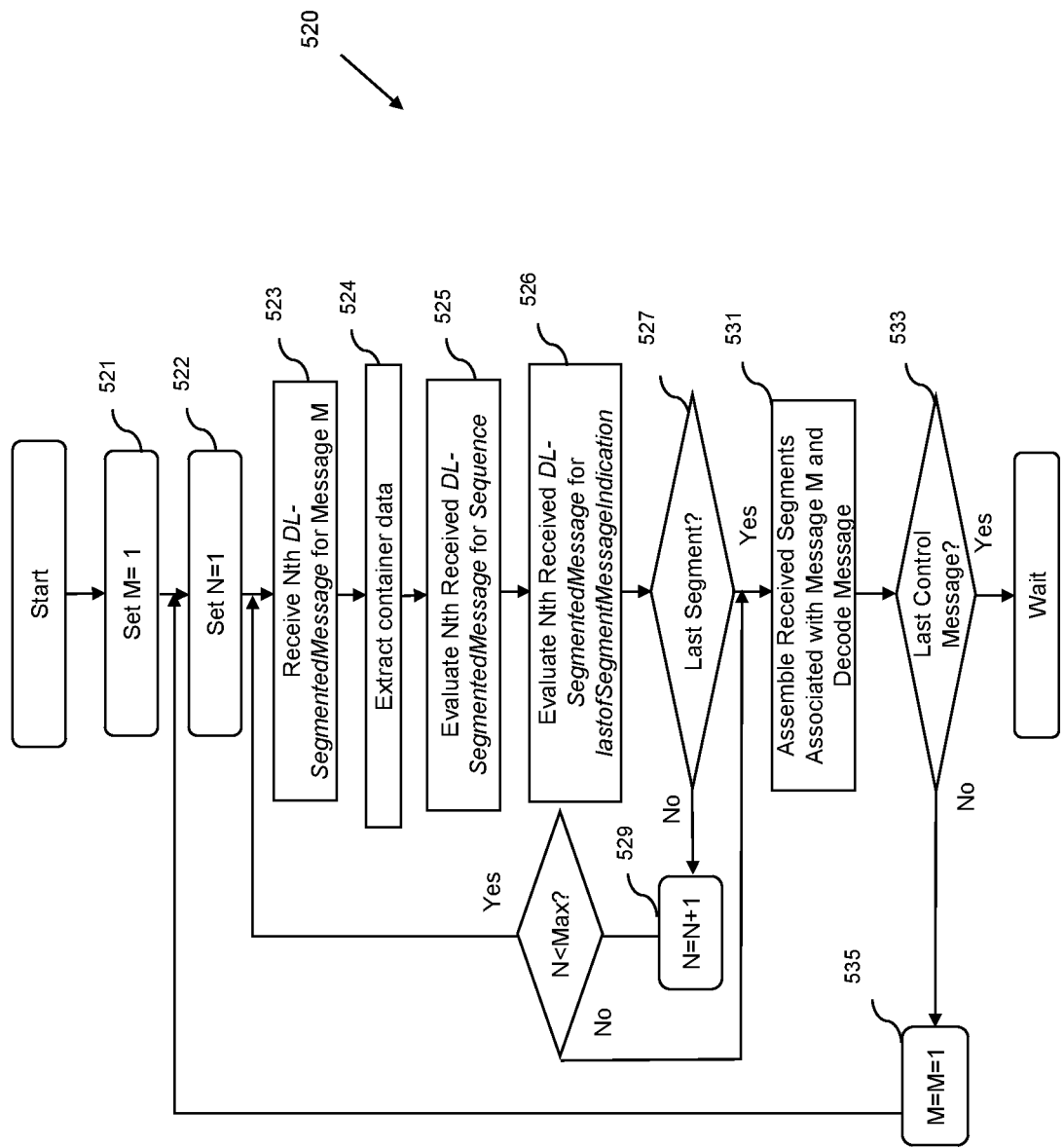
FIG. 5A is a logical flow diagram illustrating one implementation of the generalized method of FIG. 5.

FIG. 5A is a logical flow diagram illustrating one implementation of the generalized method of FIG. 5, with only the relevant logic of the RRC layers shown for clarity.

As illustrated, the method 520 of FIG. 5A begins with the segment and required number counters (N and M, respectively) being initialized; e.g., set to 1.

Per step 523, the Nth DL-SegmentedMessage is received, and the data present within the container field (e.g., less than 8996 bytes) 910 of FIG. 9 extracted per step 524.

The sequence of the received message (segment) is next evaluated per step 525 using the segment number 906 in FIG. 9.

At step 526, the lastofSegmentMessageIndication field is examined, and if the segment is the last per step 527, the message segments for that message (M) are assembled in order and the message decoded by the UEe. Steps 533, 535, and 529 operate in similar fashion to their counterparts in the method 500 of FIG. 5.

Figure 6:
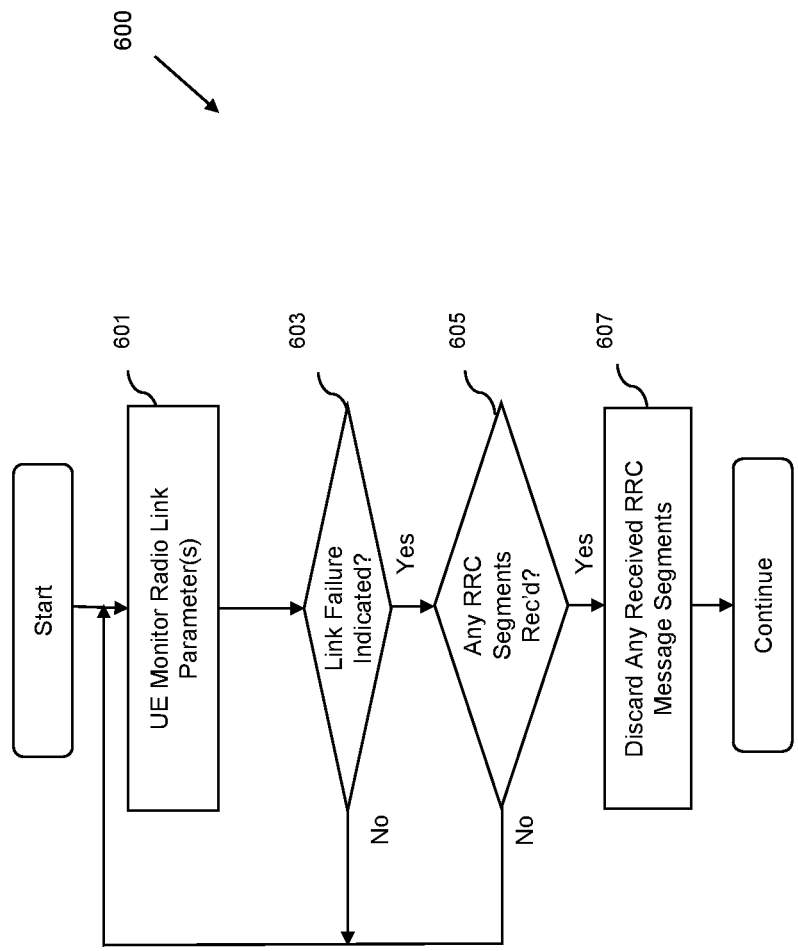
FIG. 6 is a logical flow diagram illustrating one embodiment of a method of segmented control message processing by a wireless user device, during link failure.

FIG. 6 is a logical flow diagram illustrating one embodiment of a method 600 of segmented control message processing by a wireless user device (e.g., UEe), during link failure. For clarity, only the relevant logic of the RRC layer is shown.

As illustrated, the method includes first monitoring one or more parameters of the radio link (see the exemplary protocol specified in FIG. 13), such as T310 timer expiry, random access problems, or maximum number of retransmissions.

At step 603, if link failure is identified, then the method 600 next proceeds to step 605, wherein the existence of any received message segments (e.g., if any DL-SegmentedMessage messages for an Mth message have been received). If so, the segments associated with the Mth message are discarded by the UEe. It will be appreciated that the protocol of method 600 can be applied as desired on a per-message or all-messages basis; i.e., upon link failure, either only segments associated with certain (e.g., M through M+2) messages can be discarded, or alternatively every pending (unassembled) segment still awaiting assembly can be discarded, irrespective of what message it is associated with ("total queue dump").

Figure 7:
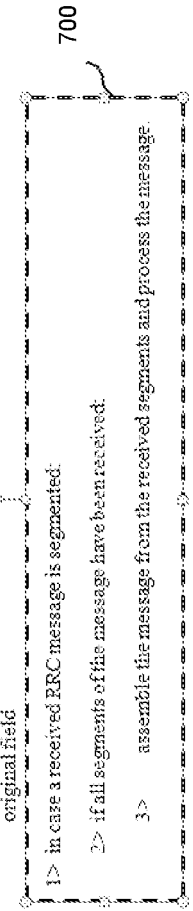
FIG. 7 is a graphical representation showing one embodiment of control message segmentation logic according to the present disclosure.

FIG. 7 is a graphical representation showing one embodiment of control message segmentation logic according to the present disclosure. While FIG. 7 is shown in the exemplary context of Section 5.1.2 (entitled "General requirements") of TS 38.331 V15.6.0 "NR; Radio Resource Control (RRC); Protocol specification" dated June 2019, it will be appreciated that the illustrated aspects of the disclosure may be used consistent with other standards and formats, the foregoing merely illustrative of the broader principles.

As shown, the extant logic of Section 5.1.2 is extended in this embodiment to include logic 700 for determining in the case of a received message that is segmented, determination of the completeness of the message, and assembly and processing when complete.

FIG. 8 is a tabular representation of one embodiment of a downlink (DL) DCCH message format according to the present disclosure. While FIG. 8 is shown in the exemplary context of Section 6.2.1 (entitled "General message structure") of TS 38.331 V15.6.0 "NR; Radio Resource Control (RRC); Protocol specification" dated June 2019, it will be appreciated that the illustrated aspects of the disclosure may be used consistent with other standards and formats, the foregoing merely illustrative of the broader principles.

With respect to FIG. 8, one exemplary embodiment introduce a new message 800 to perform RRC segmentation in the downlink direction in a generic manner. Specifically, in one variant, the new addition 800 includes a portion 210, which indicates that "spare 7 NULL" is replaced by "dl-SegmentedMessage-r16".

FIG. 9 is a tabular representation of one embodiment of a control message definition (i.e., for the added segmentation message 800 of FIG. 8) according to the disclosure. While FIG. 9 is shown in the exemplary context of Section 6.2.2 (entitled "Message definitions") of TS 38.331 V15.6.0 "NR; Radio Resource Control (RRC); Protocol specification" dated June 2019, it will be appreciated that the illustrated aspects of the disclosure may be used consistent with other standards and formats, the foregoing merely illustrative of the broader principles.

In one implementation, each segment (i.e. each "DL-SegmentedMessage") is identified via a segment number field 906. In the exemplary embodiment of FIG. 9, the segment number is designated as "segmentNumber."

In another implementation, the message includes a field which indicates the RRC message (e.g., Mth in prior examples) to which a particular segment (i.e. each "DL-SegmentedMessage") belongs. In the exemplary embodiment of FIG. 9, the indication of the RRC message to which a particular segment belongs is effected via the "rrcMessageType" field 908.

In yet another implementation, the message includes a field 902 which sets a maximum number of segments (i.e., "segmentNumber") allowed to a certain number. In the exemplary embodiment of FIG. 9, the maximum number of segments allowed is 32, although other values may be used consistent with the disclosure.

In yet another implementation, the message includes a field 910 which introduces a container (e.g., "rrc-SegmentedMessageContainer" in one implementation) to carry the individual message segment, e.g., less than 8996 bytes in length.

In yet another implementation, the message includes a portion 904 (and associated field) which provides an indication that a segmented message is the last segment identified for a given upper-layer control or resource message using "lastOfSegmentedMessageIndication". In the exemplary embodiment of FIG. 9, the last segment of a segmented message is identified by setting "lastOfSegmentedMessageIndication" to "true", although other values or designation schemes may be used consistent with the disclosure.

FIG. 10 is a tabular representation of one embodiment of a user device (e.g., UE) capability information element (IE) according to the present disclosure. While FIG. 10 is shown in the exemplary context of Section 6.3.3 (entitled "UE capability information elements") of TS 38.331 V15.6.0 "NR; Radio Resource Control (RRC); Protocol specification" dated June 2019, it will be appreciated that the illustrated aspects of the disclosure may be used consistent with other standards and formats, the foregoing merely illustrative of the broader principles.

Figure 11:
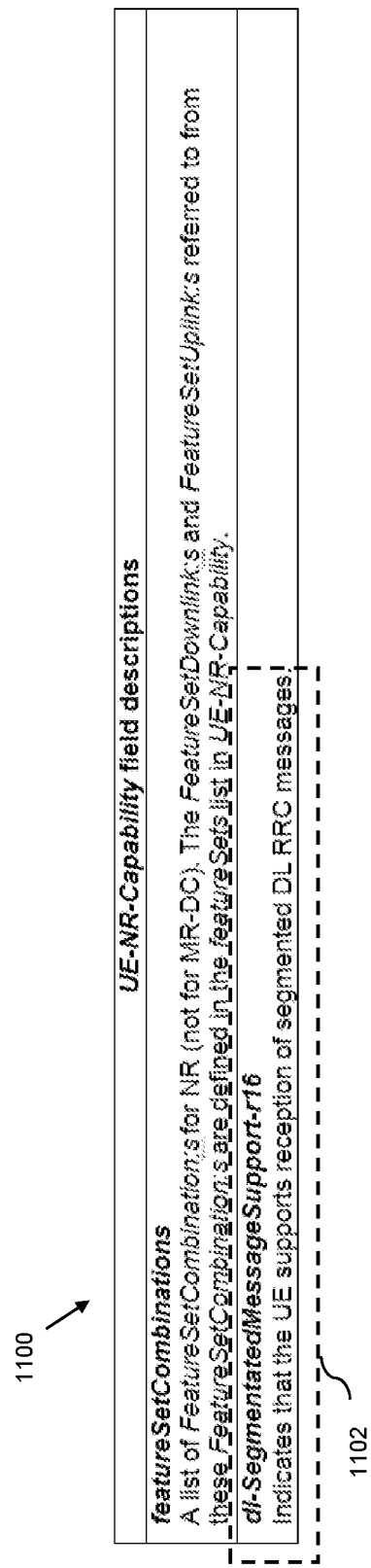
FIG. 11 is a tabular representation of one embodiment of exemplary field descriptions for use with the IE of FIG. 10.

With respect to FIG. 10, in one exemplary embodiment, the desired extension of the IE is indicated by use of "UE-NR-Capability-v16xy" data 1002, which as shown in FIG. 11, includes the field "dl-SegmentatedMessageSupport-r16" 1102 which indicates that the UE supports reception of segmented DL RRC messages.

Similarly, FIG. 12 is a tabular representation of one embodiment of a general parameter set including segmentation message support parameter, for an exemplary user device configured according to the present disclosure. In one variant, the parameter "dl-SegmentatedMessageSupport" is defined and added to the UE capability parameters of Section 4.2.2, which indicates whether the UE supports RRC Segmentation in DL as defined in TS 38.331.

FIG. 13 is a graphical representation showing one embodiment of a link failure detection and segmented message handling logic or protocol according to the present disclosure, including the aforementioned discard logic 1300 in the even that the link being monitored fails. Again, while FIG. 13 is shown in the exemplary context of Section 5.3.10.3 (entitled "Detection of radio link failure") of TS 38.331 V15.6.0 "NR; Radio Resource Control (RRC); Protocol specification" dated June 2019, it will be appreciated that the illustrated aspects of the disclosure may be used consistent with other standards and formats, the foregoing merely illustrative of the broader principles.

gNBe Apparatus

Figure 14:
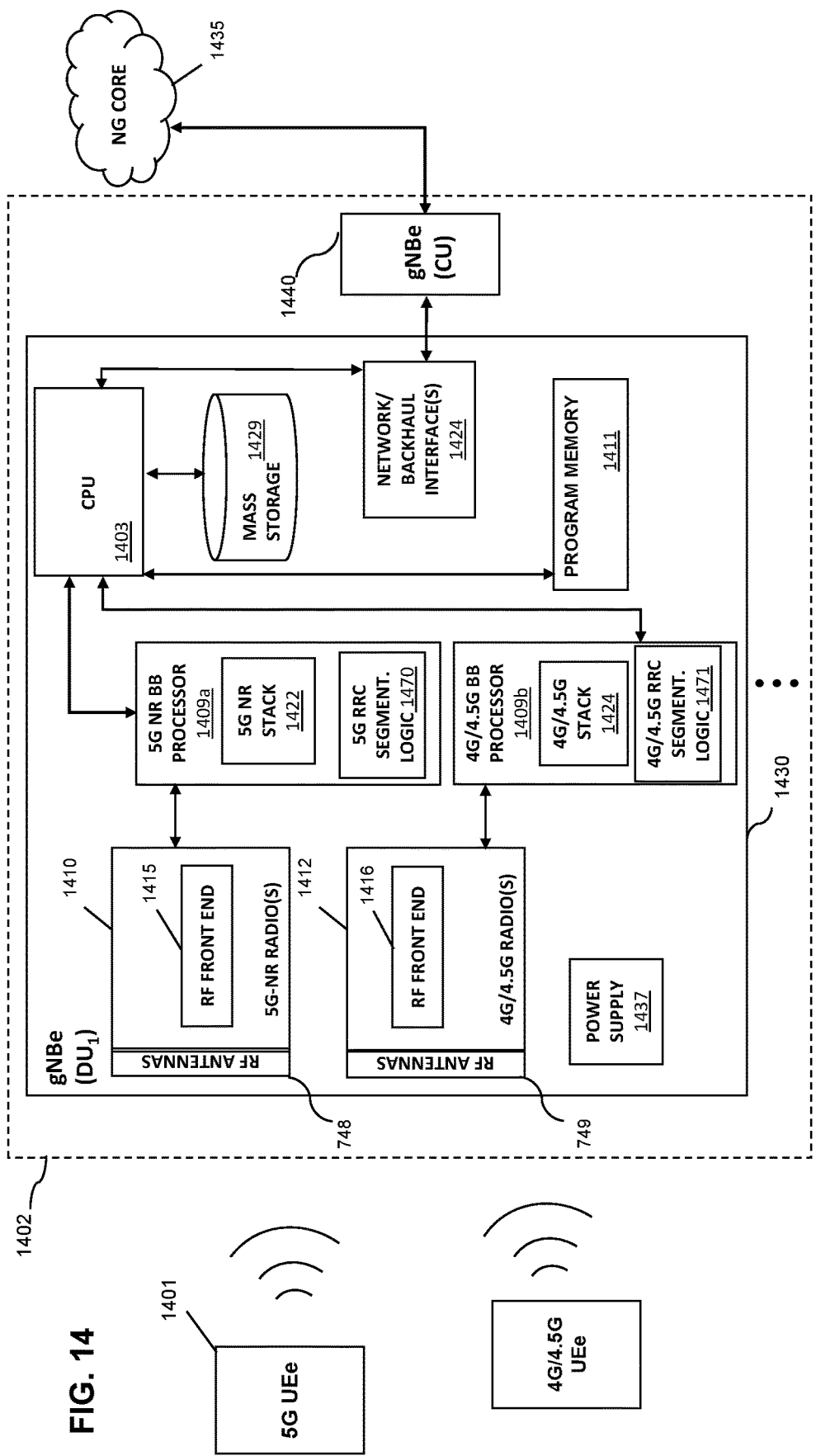
FIG. 14 is a functional block diagram illustrating one embodiment of a wireless access node (e.g., enhanced base station or 3GPP 5G NR gNBe) configured according to the disclosure.

FIG. 14 illustrates a block diagram of an exemplary embodiment of an enhanced 5G NR-enabled gNBe apparatus, useful for control message segmentation in accordance with the present disclosure.

In one exemplary embodiment as shown, the gNBe 1402 is comprised of one or more enhanced DU (distributed units)

1430, and a CU (controller unit) 1440 in data communication therewith, the latter in communication with the NGC 1435 via a backhaul interface such as a fiber drop, DOCSIS cable modem, or even another mmWave system (such as one operating at a different frequency).

In this embodiment, the enhanced DU (DUe) 1430 includes, inter alia, a processor apparatus or subsystem (CPU) 1403, mass storage 1429, a program memory module 1411, 4G/4.5G baseband processor module 1409b with 4G/4.5G stack 1424, 5G baseband processor module 1409a with 5G NR stack 1422 and RRC segmentation logic 1470 (here also implemented as software or firmware operative to execute on the processor 1409a), and 5G wireless radio interface 1410 and 4G/4.5G radio interface 1412 for communications with the relevant UEe (e.g., 5G-NR UE/UEe and 4G/4.5G UE, which may be integrated) respectively. The RF interfaces 1410, 1412 are configured to comply with the relevant PHY standards which each supports, and include an RF front end 1410, 1416 and antenna(s) elements 1448, 1449 tuned to the desired frequencies of operation (e.g., 5 GHz or 52.6-71 GHz for the 5G array, and e.g., 5 GHz for the LTE/LTE-A bands). The DUe's 1430 each also include a local power supply 1437.

Each of the gNBe radios include multiple spatially diverse individual elements in e.g., a MIMO- or MISO-type configuration, such that spatial diversity of the received signals can be utilized. For example, the aforementioned exemplary Qualcomm QTM052 mmWave antenna module may be used within the gNBe device 1402 for mmWave reception and transmission. Beamforming and "massive MIMO" may also be utilized within the logic of the gNBe device, in addition to the enhanced UL MIMO capabilities described herein.

The gNBe also includes logic for signaling the relevant UEe with UEe-specific UL MIMO configuration data, and likewise for receiving UEe-specific configuration and capability data as described elsewhere herein.

In one embodiment, the various processor apparatus 1403, 1409a, 1409b may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 1409a.

The various BB processor apparatus 1409a, 1409b may also comprise an internal cache memory, and a modem. As indicated, the gNBe 1402 in one embodiment includes a MIMO Enhancement module 1419 in the BB device memory which is in communication with the BB processing subsystem, e.g., as SRAM, flash and/or SDRAM components.

The program memory module 1411 may implement one or more of direct memory access (DMA) type hardware, so as to facilitate data accesses as is well known in the art. The memory module of the exemplary embodiment contains one or more computer-executable instructions that are executable by the CPU processor apparatus 1403.

Other embodiments may implement the RRC segmentation module/logic 1419 functionality within dedicated hardware, logic, and/or specialized co-processors (not shown). In another embodiment, the module logic 1419 is integrated with the CPU processor 1403 (e.g., via on-device local memory, or via execution on the processor of externally stored code or firmware).

In some embodiments, the gNBe 1402 also utilizes memory 1411 or other storage configured to temporarily hold a number of data relating to e.g., the various UEe identities and configurations/capabilities for use in DL RRC segmentation and/or various operating modes. For instance, the gNBe may recall data relating to particular configurations or capabilities used with a given UEe from storage (e.g., according to the capabilities IE previously described) and use this as the basis for configuring the RRC process (including segmentation where supported) for same UEe again (or even another similar UEe).

Distributed gNB Architectures—

Figure 15:
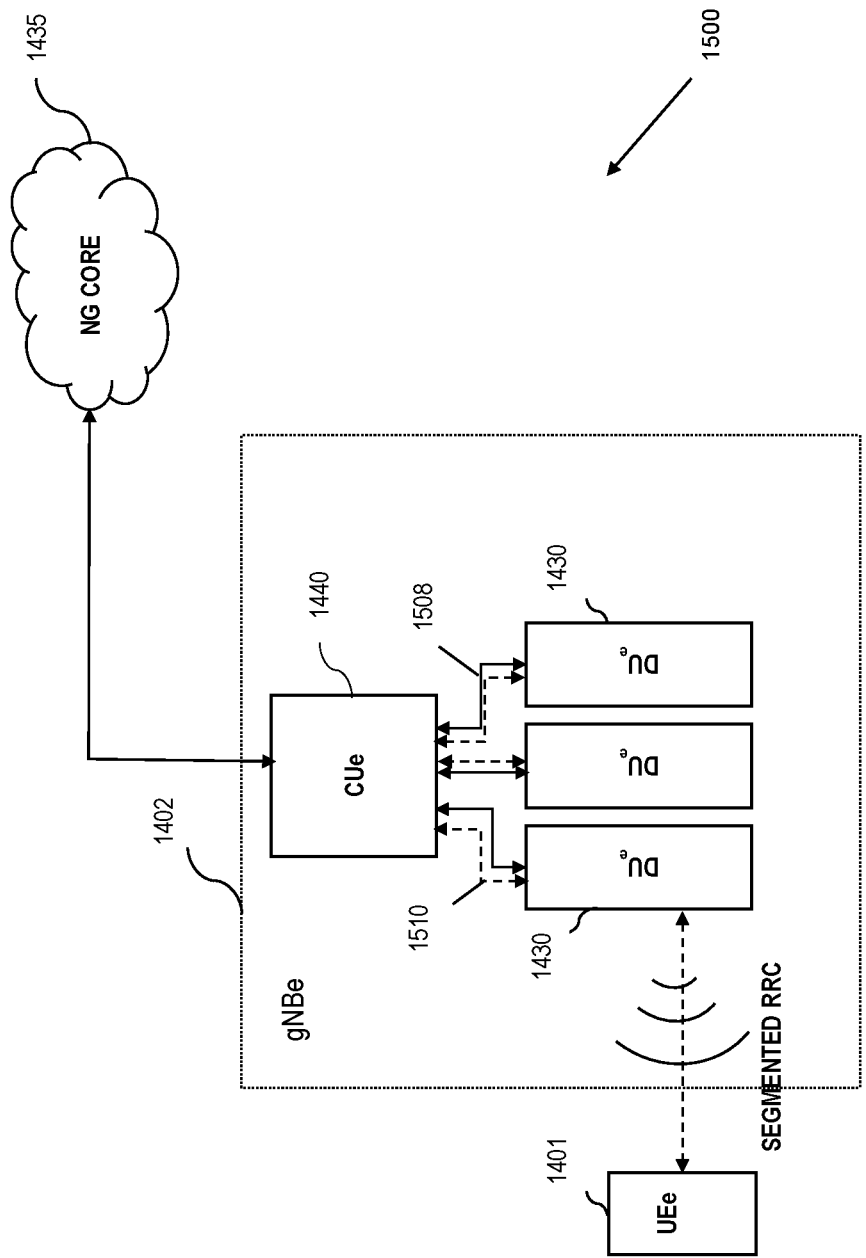
FIG. 15 illustrates one embodiment of an enhanced gNB (gNBe) CU/DU architecture according to the disclosure.

Referring now to FIG. 15, one embodiments of a distributed (CU/DU) gNBe architecture according to the present disclosure are described.

As shown in FIG. 15, the architecture 1500 includes one gNBe 1402 having an enhanced CU (CUe) 1440 and a plurality of enhanced DUs (DUe) 1430. As described in greater detail subsequently herein, these enhanced entities are enabled to permit efficient UEe/Network signaling and UEe DL RRC message segmentation, whether autonomously, or under control of another logical entity (such as the NG Core 1435 with which the gNBe's communicate, or components thereof).

The individual DUe's 1430 in FIG. 15 communicate data and messaging with the CUe 1440 via interposed physical communication interfaces 1508 and logical interfaces 1510. Such interfaces may include a user plane and control plane, and be embodied in prescribed protocols such as F1AP. It will be noted that in this embodiment, one CUe 1440 is associated with one or more DUe's 1430, yet a given DUe is only associated with a single CU. Likewise, each single CUe is communicative with a single common NG Core 1435 in this embodiment, such as that operated by an MNO or MSO.

In other architectures, two or more gNBe's may communicative with one another via e.g., an Xn interface, and accordingly can conduct at least CUe to CUe data transfer and communication (including for any desired coordination of MIMO UL functions or configurations, such as for a UEe handing over from one gNBe to another). Separate NG Cores may also be used for control and user plane (and other) functions of the network.

It will also be appreciated that while described primarily with respect to a unitary gNBe-CUe entity or device as shown in FIG. 15, the present disclosure is in no way limited to such architectures. For example, the techniques described herein may be implemented as part of a distributed or dis-aggregated or distributed CUe entity 1440 (e.g., one wherein the user plane and control plane functions of the CUe are dis-aggregated or distributed across two or more entities such as a CUe-C (control) and CUe-U (user)), and/or other functional divisions are employed.

It is also noted that heterogeneous architectures of eNBe's or femtocells (i.e., E-UTRAN LTE/LTE-A Node B's or base stations) and gNBes may be utilized consistent with the architecture of FIG. 15. For instance, a given DUe 1430 may act (i) solely as a DUe (i.e., 5G NR Rel. 17 RRC-segmentation capable node) and operate outside of an E-UTRAN macrocell, or (ii) be physically co-located with an eNB/eNBe or femtocell and provide NR coverage within a portion of the eNB/ENBe macrocell coverage area, or (iii) be physically non-co-located with the eNB/eNBe or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Split options between the DUe and CUe in the present disclosure may include for example:

Option 1 (RRC/PDCP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

The foregoing split options are intended to enable flexible hardware implementations which allow scalable cost-effective solutions, as well as coordination for e.g., performance features, load management, RRC segmentation and configuration, and real-time performance optimization. As noted above, Option 1 splits at the network/data link layer, while Option 2 splits the PDCP and RLC functions within the data link layer. As such, these splits may have advantages for use with certain RRC segmentation schemes of the type described herein, such as where highly capable DUe are desired for e.g., reduced latency or high degrees of distributed capacity. As such, the present disclosure also contemplates embodiments where all of the RRC segmentation functionality for the gNBe is within the DUe (as opposed to division between the CUe and DUe), in effect allowing for an "off-the-shelf" CU configuration, and conversely a CUe/DU approach allowing for off-the-shelf DU along with a single enhanced CU (i.e., CUe).

Moreover, configurable functional splits enable dynamic adaptation to various use cases and operational scenarios. Factors considered in determining how/when to implement such options can include for example: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It will also be appreciated that while not shown, mixtures or gNBe 1402 and gNB (i.e., unenhanced gNBs), as well as DU/DUe and/or CU/CUe within those gNBe devices 1402, may be used. For example, if a given DU is known to service only UE devices with no segmentation capability, such DU may not need enhancement. As another example, if an enhanced RRC segmentation functionality described herein is contained within the CUe of a given gNBe (i.e., entirely within the controller of a given gNBe as referenced above), enhanced DU (DUe) may be obviated, and vice versa.

UEe Apparatus—

Figure 16:
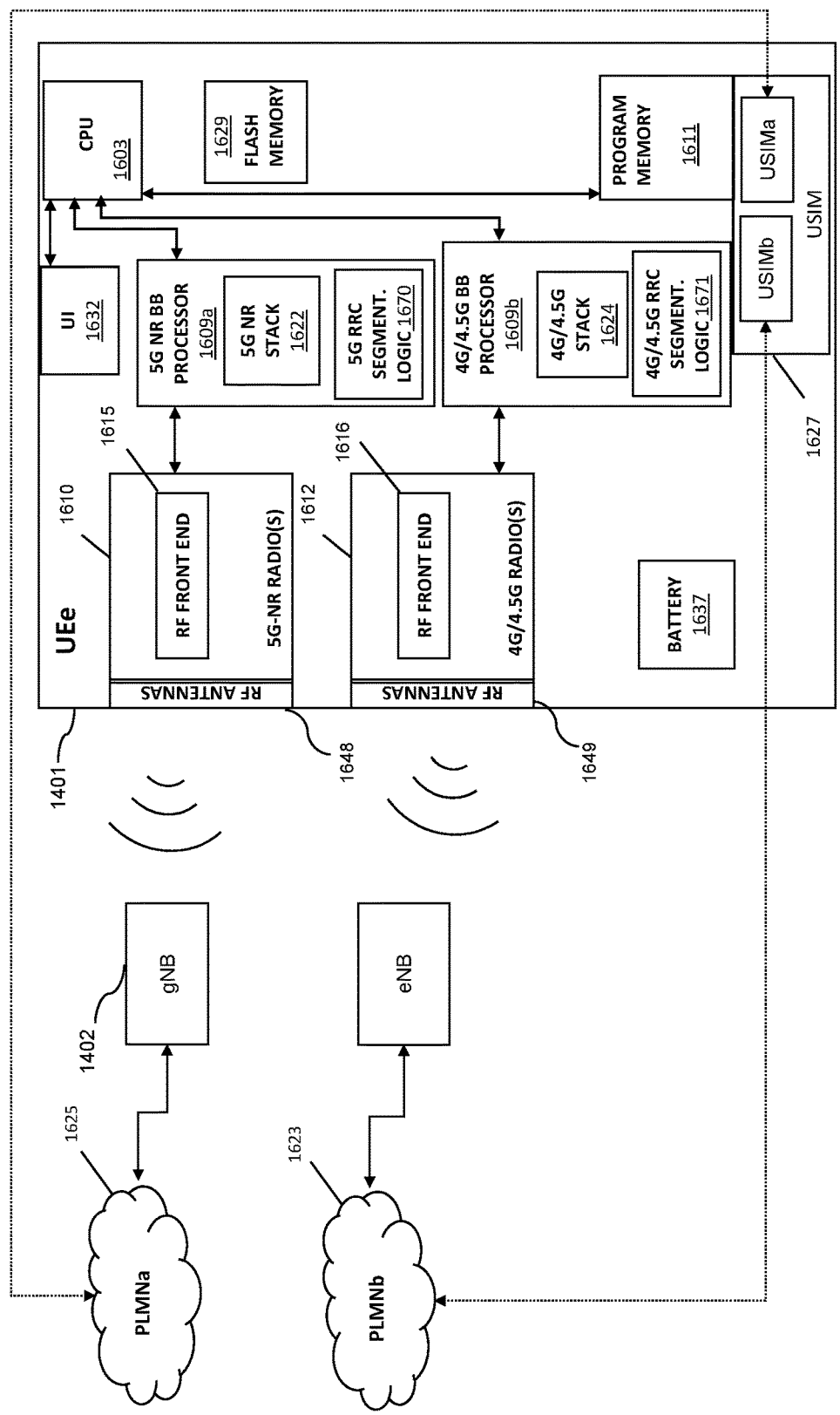
FIG. 16 is a functional block diagram illustrating an exemplary embodiment of an enhanced 3GPP-compliant user apparatus (UEe) useful with various embodiments of the present disclosure.

FIG. 16 illustrates a block diagram of an exemplary embodiment of a UEe 1401, useful for operation in accordance with the present disclosure.

In one exemplary embodiment as shown, the UEe 1401 includes, inter alia, a processor apparatus or subsystem such as a CPU 1603, flash memory or other mass storage 1629, a program memory module 1611, 4G baseband processor module 1609*b* with 4G/4.5G stack 1624, 5G baseband processor module 1609*a* with 5G NR stack 1622, and 5G wireless radio interface 1610 and 4G/4.5G radio interface 1612 for communications with the relevant RANs (e.g., 5G-NR RAN and 4G/4.5G RAN) respectively, and ultimately components of the EPC or NG Core 1635 or the AFe 713 as applicable. The RF interfaces 1610, 1612 are configured to comply with the relevant PHY standards which each supports, and include an RF front end 1610, 1616 and antenna(s) elements 1648, 1649 tuned to the desired frequencies of operation (e.g., 5 GHz or 52.6-71 GHz for the 5G array, and e.g., 5 GHz for the LTE/LTE-A bands). Each of the UEe radios include multiple spatially diverse individual elements in e.g., a MIMO- or MISO-type configuration, such that spatial diversity of the received signals can be utilized. For example, an exemplary Qualcomm QTM052 mmWave antenna module may be used within the UEe device for mmWave reception and transmission. Beamforming and "massive MIMO" may also be utilized within the logic of the UE device.

In one embodiment, the various processor apparatus 1603, 1609*a*, 1609*b* may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 1609*a*.

The various BB processor apparatus 1609*a*, 1609*b* may also comprise an internal cache memory, and a modem.

The program memory module 1611 may implement one or more of direct memory access (DMA) type hardware, so as to facilitate data accesses as is well known in the art. The memory module of the exemplary embodiment contains one or more computer-executable instructions that are executable by the CPU processor apparatus 1603.

Other embodiments may implement the application management and notification processing module/logic 1606 functionality within dedicated hardware, logic, and/or specialized co-processors (not shown). In another embodiment, the module logic 1606 is integrated with the CPU processor 1603 (e.g., via on-device local memory, or via execution on the processor of externally stored code or firmware).

In some embodiments, the UEe also utilizes memory 1611 or other storage configured to temporarily hold a number of data relating to e.g., the various application configurations for various modes. For instance, when presented with a paging cause by the network, the UEe may recall data relating to particular processing rules associated with that paging cause (e.g., based on association with the paging cause to a particular DNNx value). Rules for different networks, user contexts (e.g., "traveling," "at home," "at office," "do not disturb" and the like) may also be stored within the UEe.

Also included in the UEe 1401 is a USIM apparatus 1627, which is configured to securely store (and provide ancillary processing related to), which enables the UEe to register within one or more separate networks (e.g., an HPLMN and VPLMN). In one embodiment, the 4G/5G GUTIs are received by the UEe pursuant to registration/attach procedures, and stored within the USIM 1627 in respective storage elements thereof (e.g., SE's or cryptographically secure elements).

In some embodiments, the UEe logic also utilizes memory 1611 or other storage 1629 configured to temporarily hold a number of data relating to various PLMN associations for the various services/applications such as voice, etc.) for the various functions described herein.

In other embodiments, application program interfaces (APIs) such as those included in an MSO-provided application or those natively available on the UEe may also reside in the internal cache or other memory 1611. Such APIs may include common network protocols or programming languages configured to enable communication with the UEe and other network entities (e.g., via API "calls" to the UEe by MSO network processes tasked with gathering paging, application load, configuration, control message segmentation or other capabilities, or other data).

Service Provider Networks

Figure 17:
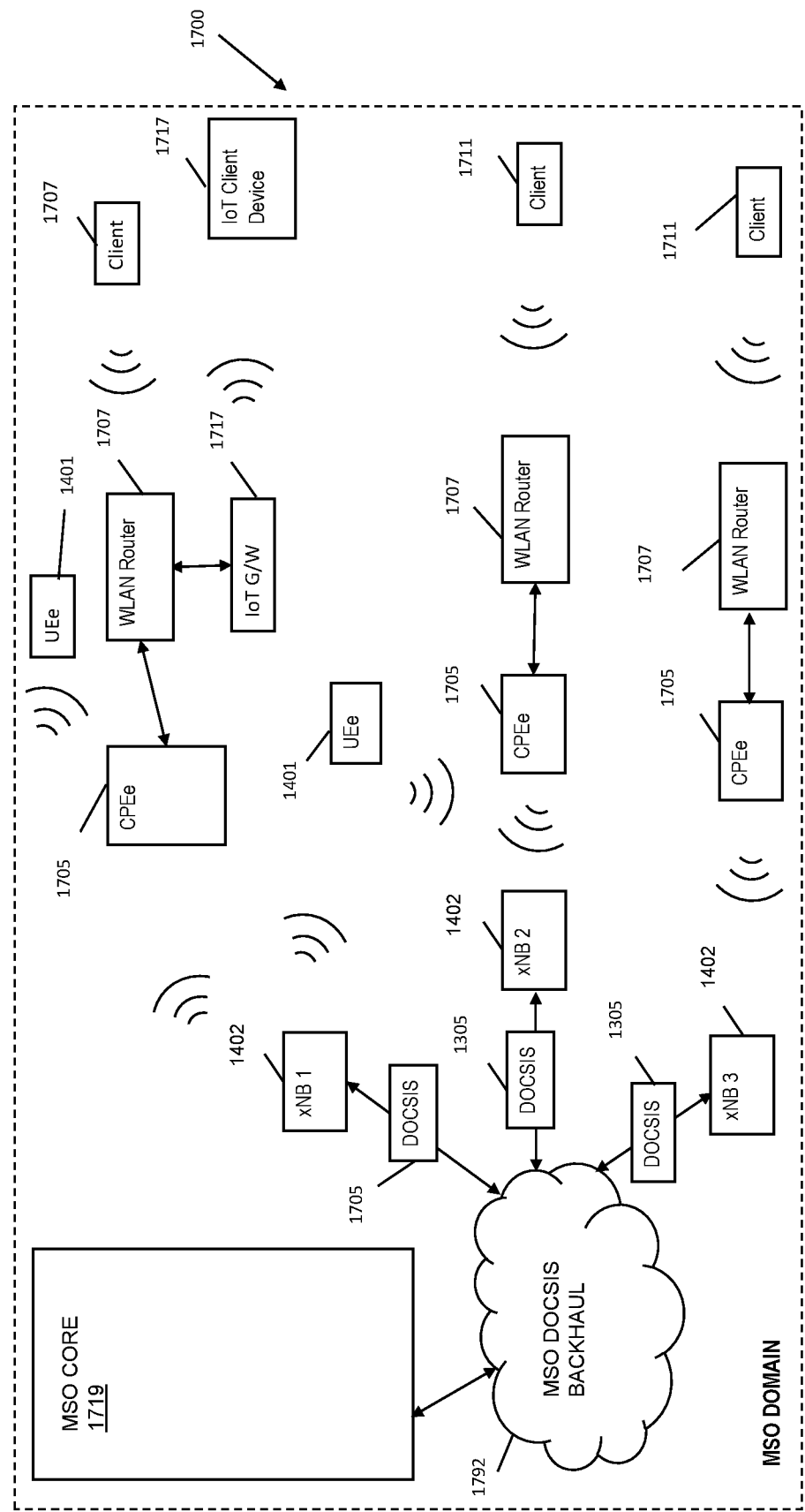
FIG. 17 is a functional block diagram of a first exemplary MSO network architecture useful in conjunction with various principles described herein.

FIG. 17 illustrates a typical service provider network configuration useful with the features of the apparatus and methods described herein. It will be appreciated that while described with respect to such network configuration, the methods and apparatus described herein may readily be used with other network types and topologies, whether wired (e.g., copper or optical) or wireless, managed or unmanaged.

The exemplary service provider network 1700 is used in the embodiment of FIG. 17 to provide backhaul and Internet access from the service provider's wireless access nodes (e.g., eNB, gNB or Node B NR-U) devices, Wi-Fi APs, and FWA devices operated or maintained by the MSO), and one or more stand-alone or embedded DOCSIS cable modems (CMs) 1705 in data communication therewith. It will be appreciated that the xNB and UEe devices described herein may operate on licensed, unlicensed, or quasi-licensed/shared access spectrum while utilizing the underlying 3GPP 4G/5G NR/NR-U based protocols described herein.

The individual xNB's 1402 are backhauled by the CMs 1705 to the MSO core via e.g., CMTS or CCAP MHAv2/RPD or other such architecture, and the MSO core 1719 includes at least some of the EPC/5GC core functions previously described. The enhanced network processes are in one embodiment realized as one or more network-based servers which communicates with the MSO infrastructure so as to effect various functions, including those of FIGS. 4-13 as previously described.

Client devices 1711 such as tablets, smartphones, Smart-TVs, etc. at each premises are served by respective WLAN routers 1707, IoT gateways 1717, and NR-U or CBRS capable CPEe/FWAe 1705, the latter which are backhauled to the MSO core or backbone via their respective xNB's, and which themselves may be enhanced with control message segmentation/receipt capability to act in effect as fixed UEe. While such devices may not be mobile as in the exemplary UEe 1401 previously described, they may benefit from the ability to e.g., handle longer PDCP protocol RRC messages during operation. As such, the present disclosure contemplates servicing of any number of different configurations of UEe including both mobile and fixed devices, and a number of possible RAN and PLMN configurations (including femto-cell and small-cell "micro" PLMNs maintained by multiple different subscribers or enterprises, including those operating within or adjacent to coverage areas of MSO or MNO macrocells.

Notably, in the embodiment of FIG. 17, all of the necessary components for support of the wireless service provision and backhaul functionality are owned, maintained and/or operated by the common entity (e.g., cable MSO). The approach of FIG. 17 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DU/CU Option "splits" within the infrastructure, selection or configuration of subsets or groups of gNB (or their individual DU), etc.

Figure 18:
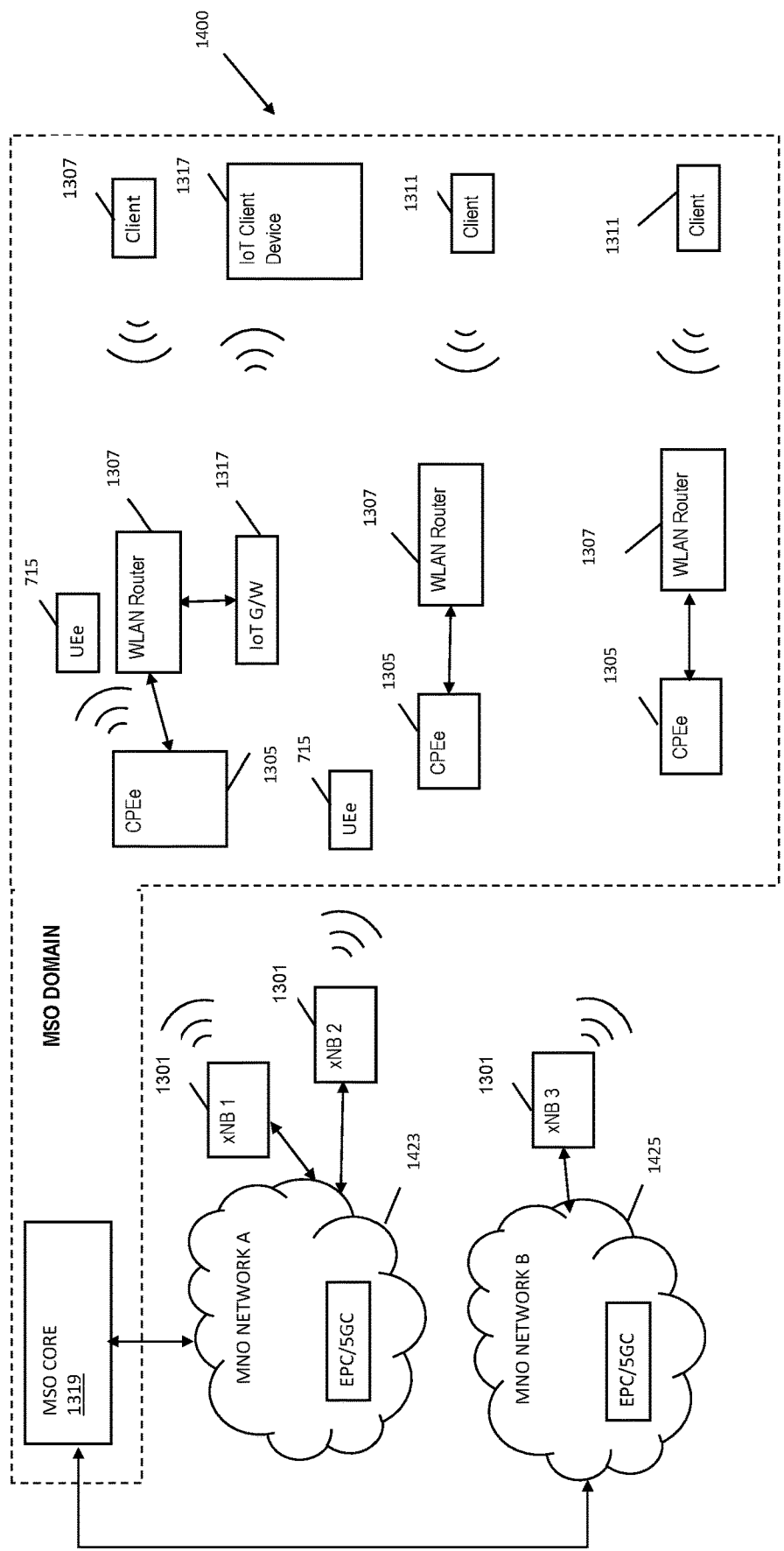
FIG. 18 is a functional block diagram of an exemplary MNO network architecture useful in conjunction with various principles described herein, wherein respective portions of the infrastructure are managed or operated by the MSO and one or more MNOs.

FIG. 18 illustrates another embodiment of the network architecture, highlighting one possible relationship between an MSO architecture and an MNO architecture. As shown, the MSO service domain extends only to the CPEe/FWAe and served premises and the MSO core functions, while other functions such as 3GPP EPC/E-UTRAN or 5GC and NG-RAN functionality, are provided by one or more MNO networks 1823, 1825 operated by MNOs (which may belong to the same or different operators), including in some embodiments those with which the MSO has a service agreement. The approach of FIG. 18 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) RAN components such as xNB's or other transceivers.

Hence, depending on what data is useful to the MSO or its customers, various portions of the foregoing can be associated and stored to particular xNB "clients" or their components being backhauled by the MSO network, whether owned by the MSO, MNO, or another entity. These data can also be utilized by e.g., a controller or another network process in control and management processes for UEe's within the infrastructure, such as based on operational loading of a given xNB or the network as a whole, RRC segmentation capability (or lack thereof) for a given UE/UEe, UEe location relative to the xNB's, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for control message processing within a wireless user device, the wireless user device configured for wireless communication with a wireless access node, the computerized method comprising:
  receiving a plurality of message segments belonging to a control message sent from the wireless access node;
  determining that the plurality of message segments comprise a complete control message;
  based on the receiving, utilizing the plurality of message segments to assemble the control message; and decoding the assembled control message;
wherein an amount of the plurality of message segments comprises a maximum number of segments allowed, the maximum number of the segments comprising thirty-two (32) segments.

2. The computerized method of claim 1, wherein:
the control message comprises downlink (DL) Radio Resource Control (RRC) message of a 5G (Fifth Generation) New Radio (NR) system; and
the receiving of the plurality of message segments comprises receiving the plurality of message segments on a DL Dedicated Control Channel (DCCH).

3. The computerized method of claim 2, wherein the receiving of the plurality of message segments on the DL Dedicated Control Channel (DCCH) comprises receiving the plurality of message segments using at least protocol which has a maximum message size limit, the control message having been segmented based on the maximum message size limit before transmission thereof to the wireless user device.

4. The computerized method of claim 2, further comprising, based on a detection of a radio link failure, causing removal of the plurality of message segments from a storage apparatus.

5. The computerized method of claim 1, wherein the receiving of the plurality of message segments comprises receiving the plurality of message segments as part of a container structure.

6. The computerized method of claim 1, further comprising:
assigning each of the plurality of message segments an associated segment number; and
identifying each of the plurality of message segments based at least on the respective segment numbers associated therewith.

7. The computerized method of claim 6, further comprising receiving data indicative that one of the plurality of message segments is a last one of the plurality of message segments to be received.

8. A wireless user device comprising:
a digital processor apparatus;
a wireless network interface in data communication with the digital processor apparatus; and
a computer readable storage medium in data communication with the digital processor apparatus, the computer readable storage medium including at least one computer program configured to, when executed on the digital processor apparatus, cause the wireless user device to:
receive, from a wireless access node of a wireless network, data representative of a request for a capabilities information element from the wireless user device, the capabilities information element comprising at least data indicating (i) that the wireless user device supports reception of segmented messages in a downlink direction from the wireless access node, and (ii) a maximum number of segments respectively associated with the segmented messages that the wireless user device is capable of receiving;
based on the request for the capability information, cause transmission of the capabilities information element to the wireless access node of the wireless network via the wireless network interface, the capabilities information element comprising data indicative that the wireless user device is capable of reception and processing of segmented control messages;
receive via a control channel established between the wireless user device and the wireless access node, a plurality of segments of a control message transmitted from the wireless access node; and
execute computerized logic configured to perform one of:
(a) based at least on receipt of a particular one of the plurality of segments and data indicative that the particular one is a last segment of the control message, assemble the control message from the plurality of segments, and process the assembled control message; or
(b) based at least on lack of receipt of the last segment of the control message within a prescribed time period, cause discard of the received plurality of segments.

9. The wireless user device of claim 8, wherein the at least one computer program is further configured to, when executed on the digital processor apparatus, cause the wireless user device to:
receive a second plurality of segments of a second control message; and
receive data indicative that (i) individual ones of the plurality of segments belong to the control message, and (ii) individual ones of the second plurality of segments belong to the second control message.

10. The wireless user device of claim 8, wherein:
a) the wireless user device comprises a 3GPP (Third Generation Partnership Project) User Equipment (UE) compliant with at least 3GPP 5G (Fifth Generation) NR (New Radio) Release 16;
b) the capabilities information element comprises a 5G-NR-UE Capability Information Element (IE) compatible with at least 3GPP Release 16;
c) the at least data indicating (i) that the wireless user device supports the reception of the segmented messages in a downlink from the wireless access node comprises data indicating that the 3GPP UE supports reception of segmented downlink (DL) RRC (Radio Resource Control) messages; and
d) the at least data indicating (ii) the maximum number of segments associated with the segmented messages that the wireless user device is capable of receiving comprises data indicating thirty-two (32) segments maximum.

11. The wireless user device of claim 8, wherein:
the wireless user device comprises a 3GPP (Third Generation Partnership Project) User Equipment (UE) compliant with at least 3GPP 5G (Fifth Generation) NR (New Radio) Release 16, and is associated with a subscriber of a managed content distribution network managed by a Multiple Systems Operator (MSO); and
the wireless network interface is configured to utilize one or more NR-U (New Radio—Unlicensed) frequency bands for wireless communication between the wireless access node and the 3GPP UE.

12. The wireless user device of claim 8, wherein:
the wireless user device comprises a 3GPP (Third Generation Partnership Project) User Equipment (UE) compliant with at least 3GPP 5G (Fifth Generation) NR (New Radio) Release 16, and is associated with a subscriber of a managed content distribution network managed by a Multiple Systems Operator (MSO); and the wireless network interface is configured to utilize one or more CBRS (Citizens Broadband Radio Service) frequency bands for wireless communication between the wireless access node and the 3GPP UE, the one or more CBRS frequency bands between 3.55 GHz and 3.70 GHz inclusive.

13. The wireless user device of claim 8, wherein:
the wireless user device comprises a CBRS (Citizens Broadband Radio Service) Fixed Wireless Apparatus (FWA), and is associated with a subscriber of a managed content distribution network managed by a Multiple Systems Operator (MSO); and
the wireless network interface is configured to utilize one or more CBRS frequency bands for wireless communication between the wireless access node and the CBRS FWA, the one or more CBRS frequency bands between 3.55 GHz and 3.70 GHz inclusive.

14. Computer readable apparatus comprising a non-transitory storage medium, the non-transitory storage medium comprising at least one computer program comprising a plurality of instructions which are configured to, when executed on a digital processor apparatus of a computerized network wireless access node, cause the computerized network wireless access node to:
transmit, to a wireless user device, data representative of a request for capability information;
based on the request for the capability information, receive at least data indicative that the wireless user device supports receipt of segmented resource control messages in a downlink direction;
based at least on the received at least data, cause generation of a plurality of segments for one or more resource control messages; and
transmit the plurality of segments to the wireless user device for assembly thereby;
wherein the receipt of the data indicative that the wireless user device supports the receipt of the segmented resource control messages in the downlink direction comprises receipt of an extension element of a 3GPP (Third Generation Partnership Project) 5G-NR (Fifth Generation New Radio) capability information element (IE); and
wherein the generation of the plurality of segments for the one or more resource control messages is based at least in part on data contained in the extension element.

15. The computer readable apparatus of claim 14, wherein the plurality of instructions are further configured to, when executed on the digital processor apparatus, cause the computerized network wireless access node to:
based on the request for the capability information, receive data representative of parameters relating to the support by the wireless user device of the receipt of the segmented resource control messages in the downlink direction, the parameters comprising at least a maximum number of segments that the wireless user device is allowed to receive; and
wherein transmission of the plurality of segments comprises transmission of a number of segments at or below the maximum number.

16. The computer readable apparatus of claim 14, wherein the plurality of instructions are further configured to, when executed on the digital processor apparatus, cause the computerized network wireless access node to:
encode the plurality of segments in a container format;
wherein: (i) the transmission of the plurality of segments to the wireless user device comprises transmission of the plurality of segments in the container format, and (ii) the container format enables the wireless user device to identify a last one of the plurality of segments with respect to a sequence.

17. The computer readable apparatus of claim 16, wherein each of the plurality of segments are designated by a segment number, and the respective segment numbers of the plurality of segments enable the wireless user device to assemble the one or more resource control messages in accordance with the sequence.

18. The computer readable apparatus of claim 14, wherein:
the one or more resource control messages comprise at least two resource control messages;
each of the plurality of segments are associated with a message type; and
the respective message types associated with the plurality of segments indicate to which of the at least two resource control messages individual ones of the plurality of segments belong.

19. The computer readable apparatus of claim 14, wherein:
the computerized network wireless access node comprises a 5G Node B (gNB);
the one or more resource control messages comprise RRC (radio resource control) messages; and
the transmission of the plurality of segments to the wireless user device for the assembly thereby comprises scheduled transmission on a downlink DCCH (dedicated control channel).

20. The computer readable apparatus of claim 14, wherein the generation of the plurality of segments for the one or more resource control messages based at least in part on the data contained in the extension element comprises generation of the plurality of segments to obey a maximum number of segments which the wireless user device can process.

21. The computer readable apparatus of claim 20, wherein:
a) the wireless user device comprises a 3GPP (Third Generation Partnership Project) User Equipment (UE) compliant with at least 3GPP 5G (Fifth Generation) NR (New Radio) Release 16; and
b) the extension element of the 3GPP 5G-NR capability information element (IE) comprises at least one field comprising at least one sequence of numbers, the at least one sequence of numbers indicative of the maximum number of segments.

22. The computer readable apparatus of claim 14, wherein:
the wireless user device comprises a 3GPP (Third Generation Partnership Project) User Equipment (UE) compliant with at least 3GPP 5G (Fifth Generation) NR (New Radio) Release 16, and is associated with a subscriber of a managed content distribution network managed by a Multiple Systems Operator (MSO); and
the computerized network wireless access node comprises a gNodeB (gNB) device compliant with at least 3GPP 5G (Fifth Generation) NR (New Radio) Release 16, the gNB device a) comprising part of the managed content distribution network managed by the MSO, and b) utilizing one or more NR-U (New Radio Unlicensed) frequency bands for wireless communication between the gNB and the 3GPP UE.

23. The computer readable apparatus of claim 14, wherein:
the wireless user device comprises a 3GPP (Third Generation Partnership Project) User Equipment (UE) compliant with at least 3GPP 5G (Fifth Generation) NR (New Radio) Release 16, and is associated with a subscriber of a managed content distribution network managed by a Multiple Systems Operator (MSO); and the computerized network wireless access node comprises a gNodeB (gNB) device compliant with at least 3GPP 5G (Fifth Generation) NR (New Radio) Release 16, the gNB device a) comprising part of the managed content distribution network managed by the MSO, and b) utilizing one or more CBRS (Citizens Broadband Radio Service) frequency bands for wireless communication between the gNB and the 3GPP UE, the one or more CBRS frequency bands between 3.55 GHz and 3.70 GHz inclusive.

24. The computer readable apparatus of claim 14, wherein:

the wireless user device comprises a 3GPP (Third Generation Partnership Project) User Equipment (UE) compliant with at least 3GPP 5G (Fifth Generation) NR (New Radio) Release 16; and the computerized network wireless access node comprises a gNodeB (gNB) device compliant with at least 3GPP 5G (Fifth Generation) NR (New Radio) Release 16, the gNB device comprising part of a managed content distribution network managed by a Multiple Systems Operator (MSO), the gNB device backhauled to a core of the MSO-managed content distribution network via MSO HFC (hybrid fiber coaxial) infrastructure.

25. Computer readable apparatus comprising a non-transitory storage medium, the non-transitory storage medium comprising at least one computer program comprising a plurality of instructions which are configured to, when executed on a digital processor apparatus of a computerized network wireless access node in data communication with a managed content distribution network, cause the computerized network wireless access node to:

transmit to a wireless user device data representative of a request for capability information;

responsive to the request for the capability information, receive at least data indicative that the wireless user device supports receipt of segmented resource control messages in a downlink direction, the received data comprising an extension element of an extant 3GPP (Third Generation Partnership Project) 5G-NR (Fifth Generation New Radio) capability information element (IE);

based at least on the received at least data, cause generation of a plurality of segments for one or more resource control messages, the generation of the plurality of segments based at least in part on a sequence of enumerated data elements contained in the extension element and prescribing at least one limitation on the generation of the plurality of segments; and transmit the plurality of segments to the wireless user device for assembly thereby, the transmission being compliant with the prescribed at least one limitation.

\* \* \* \* \*